United States Patent
Koyanagawa et al.

(10) Patent No.: US 6,806,594 B2
(45) Date of Patent: Oct. 19, 2004

(54) COIL UNIT FOR LINEAR MOTOR

(75) Inventors: Yasushi Koyanagawa, Isehara (JP); Hidehiko Mori, Hachinouji (JP); Tatsuro Kato, Tokorozawa (JP); Masanobu Sugimine, Ohmiya (JP); Daisuke Shinohira, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 12 days.

(21) Appl. No.: 10/078,261

(22) Filed: Feb. 20, 2002

(65) Prior Publication Data

US 2003/0155818 A1 Aug. 21, 2003

(51) Int. Cl.[7] .............................................. H02K 41/00
(52) U.S. Cl. .............................. 310/12; 310/12; 310/15
(58) Field of Search ..................................... 310/12, 15

(56) References Cited

U.S. PATENT DOCUMENTS 6,590,355 B1 * 7/2003 Kikuchi et al. ............. 318/135

FOREIGN PATENT DOCUMENTS

| JP | 48-68706 | 12/1971 |
| JP | 63-048152 | 2/1988 |
| JP | 10-309071 | 11/1998 |
| JP | 2000-041362 | 2/2000 |

* cited by examiner

Primary Examiner—Dang Le
Assistant Examiner—Iraj A. Mohandesi
(74) Attorney, Agent, or Firm—Arent Fox PLLC

(57) ABSTRACT

A coil in a coil unit for a linear motor is evenly cooled in the lengthwise direction to reduce an influence of heat on the outside from the coil unit. The coil unit includes the plate-shape coil extending in a traveling direction of the linear motor, a shell for internally storing the coil while maintaining a predetermined gap to the coil, and leading a refrigerant through the gap to cool the coil, a main flow passage formed inside the shell while extending in a lengthwise direction X of the coil, and leading the refrigerant supplied from the outside into itself, and a plurality of branch flow passages formed at a predetermined interval in the lengthwise direction X on the main flow passage for leading out the refrigerant led into the main flow passage in a widthwise direction Y of the coil. The refrigerant led out from the branch flow passages after having flown through the main flow passage flows into the gap between the shell and the coil, and cools the coil along the widthwise direction Y.

40 Claims, 15 Drawing Sheets

COIL UNIT FOR LINEAR MOTOR

BACKGROUND OF THE INVENTION

1. Field of the Invention

The present invention relates to a coil unit for a linear motor, more specifically relates to a technology for cooling the coil with the refrigerant.

2. Description of the Related Art

Conventionally, in exposing devices for manufacturing semiconductor devices and high precision machining devices, it has been required to position an object (for example, a wafer to be exposed or a workpiece) fast and precisely. As a device for precisely positioning used for that purpose, devices for converting a rotation of a rotary motion type motor into a linear motion through a ball screw, and linear motion type motors (so-called linear motors) are widely used.

Among them, the linear motor has a simple structure, includes a small number of parts, has merits that its linear motion is directly used, and positions an object fast. It also includes characteristics that its small friction resistance during driving increases the motion precision. Because of the reasons describes above, the linear motor has been becoming a mainstream as a linear drive device in all fields where a precise positioning is required, and is widely used in a manufacturing process for a liquid crystal display device, for example.

This linear motor generally comprises a magnetic pole unit provided with magnets, and a coil unit provided with a coil. Either one of the magnetic pole unit and the coil unit is connected with a certain base, and functions as a stator, and the other of them is connected with a moving table, for example, and functions as a movable element. The magnetic unit and the coil unit are separated by a certain gap to avoid a contact, and relatively move linearly while the gap is maintained.

A coil provided for the coil unit generates heat when an electric current is supplied. This generated heat transfers to the entire coil unit, and further to the base and the moving table, for example, connected with the coil unit. As a result, problems described below occur.

(1) The heat from the coil causes thermal expansions of the coil unit itself and an associated machine connected with the coil unit, and causes an error in a positioning precision. Specifically, when the associated machine connected with the coil unit is a low thermal expansion material (thermal expansion coefficient is $1 \times 10^{-6}$) of 100 mm in length, for example, a thermal deformation of 100 nm is generated when the temperature increases by 1° C. If a positioning precision of the order of one nanometer is required, this thermal expansion prevents satisfying the requirement sufficiently.

(2) A laser interferometer or the like is installed in the vicinity of the linear motor to measure a motion of the linear motor. When the coil unit heats an atmosphere around to generate a "fluctuation", a light path of laser light is influenced, and a measurement error occurs.

It is known as a technique for solving the problem in (1) that a refrigerant is flowed between a mounting surface to an associated machine, and the coil in the coil unit to prevent the heat transfer from the coil. However, this technique cannot restrain temperature of an atmosphere around the coil unit from increasing, and the problem in (2) still remains unsolved.

A coil unit shown in FIG. 13 and FIG. 14 is proposed to solve both of the problems in (1) and (2). The coil unit 10 is used for a linear motor 1, and is placed so as to oppose to magnets 3 in a magnet unit 2.

Specifically, this coil unit 10 is provided with a plate-shape coil 12 placed opposing to the magnets 3 while extended in a traveling direction X, and a shell 14 for storing the coil 12 inside, and passing a refrigerant through gaps 13 between itself and the coil 12 to cool the coil 12. On the other hand, the magnet unit 2 is provided with a base 4 whose cross section is in a U shape, and the magnets 3 installed on inner walls 4A opposing to each other in the base 4.

A mounting surface 16 agaist to an associated machine is formed outside of one edge in a widthwise direction Y of the shell 14, a supplying hole 18 is formed on one end in a lengthwise direction X of the mounting surface 16 for supplying the gaps 13 of the shell 14 with the refrigerant, and a draining hole 20 is formed on the other end for draining the refrigerant. When the coil unit 10 is connected with an associated machine on a "fixed side" through this mounting surface 16, the coil unit 10 serves as a stator, and the magnet unit 2 serves as a movable element. Inversely, when the coil unit 10 is connected with an associated machine on a "traveling side", the coil unit 10 serves as a movable element, and the magnet unit 2 serves as a stator.

The refrigerant supplied from the supplying hole 18 diffuses in the gaps 13 between the coil 12 and the shell 14, and exchanges heat with the coil 12. Thus, the coil 12 which generates heat due to a current is cooled, and the refrigerant is heated. Because the heated refrigerant is drained from the draining hole 20, the heat does not accumulate inside the coil unit 10, a radiation to the atmosphere around is reduced, and a transfer of the heat from the coil 12 to the mounting surface 16 is restrained, thereby reducing a thermal expansion of the associated machine. As a result, this linear motor 1 has a reduced influence on the outside caused by the heat generation from the coil 12, and provides a more precise positioning.

However, this coil unit 10 does not always provide a sufficient cooling effect. FIG. 15 specifically shows a schematic diffusion status of the refrigerant inside the shell 14. The refrigerant gradually spreads as A, B, C, . . . , becomes a parallel flow, converges as F. G. and H, and is finally drained from the draining hole 20. Because the refrigerant is heated as it moves toward the downstream side, the temperature increases roughly in this order of A, B, C, . . . E, G, and H.

As a result, especially, the temperature of the refrigerant close to the downstream side (E, G, and H) is much higher than that on the upstream side, the cooling efficiency decreases, and simultaneously the heat transfers to the shell 14 through the refrigerant in this high temperature state, and is radiated outside. Further, the heat transfers to the mounting surface 16 through the refrigerant in this high temperature state on the downstream side, and becomes a cause for inducing a thermal expansion of the associated machine.

This property unavoidably presents even if the pressure of the refrigerant (a supplying pressure) and the width of the gaps are designed relatively favorably. If the design is not favorable, it is highly probable that a part where the refrigerant hardly flows actually occurs, and the defect sometimes becomes more remarkable.

Because it is required to increase the flow rate of the refrigerant to increase the cooling efficiency for avoiding this problem, problems such as increasing the capacity of a recirculating pump for the refrigerant occur.

The present invention is devised in view of the problems describe above relating to the cooling.

SUMMARY OF THE INVENTION

A coil unit for a linear motor relating to the present invention comprises a shell for using a refrigerant to cool a coil of a linear motor, a main flow passage formed inside the shell while extending in a lengthwise direction of the coil for leading the refrigerant supplied from the outside into itself, and a plurality of branch flow passages, formed on the main flow passage at a predetermined interval in the lengthwise direction, for draining the refrigerant led into the main flow passage in a widthwise direction of the coil, where the refrigerant drained from the branch flow passages after flowing through the main flow passage, flows through a gap between the shell and the coil to cool the coil.

This coil unit leads and stores the refrigerant in the lengthwise direction of the coil, and simultaneously branches the stored refrigerant toward the widthwise direction. Specifically, the coil unit is structured such that the main flow passage leads the refrigerant in the lengthwise direction of the coil, then the refrigerant is drained from the plurality of branch flow passages while the pressure inside the main flow passage is increased approximately evenly in the lengthwise direction of the coil. As a result, the coil is cooled along the widthwise direction at the individual positions in the lengthwise direction, the coil is cooled more evenly than in the conventional structure where the refrigerant flows over the entire surface of the coil mainly in the lengthwise direction. Thus a local temperature increase can be prevented.

When the quantity of the refrigerant increases, it is only required to increase an anti-pressure capability of a periphery of the main flow passage, and the branch flow passages serve as an absorbing member to provide almost an equal pressure distribution across the lengthwise direction of the shell. As a result, a local high pressure on the upstream side as in the conventional structure is avoided, and it is possible to structure the shell while decreasing the thickness thereof, and to decrease the weight consequently.

It is preferable in the invention described above to provide the main flow passage extending in the lengthwise direction in the vicinity of one edge in the widthwise direction of the coil, and to form a second main flow passage extending in the lengthwise direction in the vicinity of the other edge in the widthwise direction of the coil for receiving the refrigerant having flown on the surface of the coil in the widthwise direction.

In this way, the refrigerant which has flown in the gaps between the coil and the shell (at a certain degree of high pressure) positively flows into the second main flow passage to release the pressure thereof. As a result, because a pressure gradient is formed in the widthwise direction from the main flow passage to the second main flow passage, the refrigerant flows evenly in the widthwise direction, and the entire coil is more evenly cooled. This constitution is especially suitable for cooling a coil relatively large in the widthwise direction.

It is preferable in the invention described above to form sub-flow passages in the lengthwise direction at downstream ends of the branch flow passages, for temporarily storing the refrigerant led out from the branch flow passages, and for draining the refrigerant on the surface of the coil.

In this way, the refrigerant which has flown from the main flow passage into the individual branch flow passages in a state with an equalized pressure flows into the sub-flow passages, and the pressure distribution of the refrigerant is diffused in the lengthwise direction again in these sub-flow passages. Thus, even if there remains a slight pressure deviation among the individual branch flow passages, it is possible to flow the refrigerant from the entire sub-flow passages in the widthwise direction at a pressure more evenly averaged over the entire length of the coil. Namely, these sub-flow passages serve as a buffer, and the refrigerant led out independently from the individual branch flow passages is further equalized.

It is preferable in the invention described above to provide the main flow passage extending in the lengthwise direction in the vicinity of one edge in the widthwise direction of the coil, to form a mounting surface for connecting the coil unit with an associated member on an outer peripheral surface of the shell on a side opposite to the coil through the main flow passage, and to use the main flow passage interposed between the mounting surface and the coil for restraining heat from the coil from transferring to the mounting surface.

This coil unit is connected with the associated member (including a moving member) whether the coil unit itself serves as a stator or a movable element. Because the main flow passage through which the refrigerant in the most cooled state (before cooling the coil) is interposed between the coil and the mounting surface, it is possible to efficiently restrain the heat from the coil from transferring to the mounting surface in the constitution described above. Further, because the direction of the heat transfer from the coil to the mounting surface is opposite to the direction of the refrigerant flowing to the coil surface through the main flow passage and the sub-flow passages, the heat from the coil hardly transfers toward the mounting surface. As a result, it is possible to reasonably combine the even cooling effect across the lengthwise direction of the coil, and the prevention of the heat transfer to the mounting surface.

It is preferable in the invention described above to set the predetermined interval in the lengthwise direction for forming the plurality of branch flow passages to become narrower from the upstream side to the downstream side of the refrigerant flowing through the main flow passage. This is based on the following idea.

The main flow passage actively leads the refrigerant in the cold state in the lengthwise direction of the coil, and the refrigerant in the cold state can cool even a part of the coil far from the supplying hole of the refrigerant in any one of the inventions described above. However, the pressure of the refrigerant supplied from the supplying hole to the main flow passage tends to decrease as it measures farther from the supplying hole, though it depends on a inflow resistance into the individual branch flow passages, and the flow rate may decrease (while the refrigerant is certainly cold). In this case with the constitution described above, because the interval for forming the branch flow passages becomes narrower from the upstream side to the downstream side of the refrigerant flowing through the main flow passage (namely, it becomes narrower as the location is separated farther from the supplying location of the refrigerant), the reduction of the flow rate on the downstream side is prevented, and an evener cooling effect can be obtained.

As a setting for the interval, it is possible to set such that the plurality of branch flow passages are grouped as a set, and the interval for the individual sets becomes narrower stepwise. Also there is a case where the branch flow passages cannot be provided evenly along the lengthwise direction because of a design reason, in this case, the plurality of branch flow passages may be formed on the main flow passage as a whole, setting the interval narrower from the upstream side to the downstream side. It is also preferable to set the interval wider more or less only in a vicinity at the downstream end in the lengthwise direction of the main flow passage while setting the interval narrower from the upstream side to the downstream side as a whole because a reaction force tends to increase the pressure in the vicinity at the downstream end.

As a similar idea, it is preferable to set such that at least either one of the width of the gaps between the coil and the shell, and the cross section area of the branch flow passages becomes larger from the upstream side to the downstream side of the refrigerant flowing through the main flow passage. Because this constitution increases the width of the gaps and the cross sectional area to compensate the decrease of the flow rate caused by the pressure loss on the downstream side, a more even cooling effect is provided.

When the second main flow passage in the lengthwise direction is formed in the vicinity of the other edge in the widthwise direction of the coil, it is preferable to further form a draining pipe in the widthwise direction including one end opened on an outer peripheral surface on a side of the main flow passage of the shell, and the other end for communicating with the second main flow passage where the refrigerant guided into the second main flow passage is drained through the draining pipe, and the refrigerant flows on the surface of the draining pipe from the main flow passage side to the second main flow passage side to restrain heat from the draining pipe from transferring to the shell.

Because the temperature of a refrigerant generally increases as it flows downstream in this type of a cooling structure using the refrigerant, the vicinity of the draining opening presents the highest temperature. Namely, the temperature of a vicinity of a part where a refrigerant after cooling is collected tends to become high, because the heat of the refrigerant is also collected there. In this case, because the refrigerant led by the main flow passage (in the cold state) directly covers the vicinity of the openings of the draining pipe in the constitution above, and simultaneously the refrigerant flowing in the widthwise direction around the draining pipes cools the draining pipe themselves, the heat from the draining pipe is prevented from transferring to the shell or the atmosphere around the shell, and an influence on the outside is kept to small even when the refrigerant at a high temperature is drained. Namely, even when the draining pipe provided in the widthwise direction drains the refrigerant at a high temperature, because the refrigerant flows around the draining pipe in the direction opposite to the draining direction, the refrigerant therearound keeps the heat influence on the outside small.

Also, because this structure supplies the refrigerant from the main flow passage side, and drains it from the same main flow passage side, it is easy to mount the coil unit on the associated machine, and to design a piping for the refrigerant.

As a variation of the present invention, it may adopt a coil unit for a linear motor which comprises a shell for using a refrigerant to cool a coil of a linear motor, the coil unit comprising an outer cover for storing the shell inside while maintaining a second predetermined gap, and for passing the refrigerant through the second gap for cooling the shell, a first outer main flow passage, formed in the vicinity of one edge in the widthwise direction of the shell inside the outer cover while extending in the lengthwise direction, for leading the refrigerant supplied from the outside into itself, and for draining the refrigerant to an outer surface of the shell in the widthwise direction, a second outer main flow passage, formed in the vicinity of the other edge in the widthwise direction of the shell inside the outer cover while extending in the lengthwise direction, for receiving the refrigerant having flown in the widthwise direction on the outer surface of the shell after flowing through the first outer main flow passage, and supplying the refrigerant into the shell, and a draining pipe for draining the refrigerant having flown on a surface of a coil inside the shell to the outside.

The coil unit relating to this constitution adopts a double cooling structure where the additional outer cover is provided around the shell. Further, the coil unit is structured such that the first outer main flow passage guides the refrigerant (in a low temperature state) in the lengthwise direction of the coil, and the refrigerant flows in the widthwise direction (from the one end to the other end) through the second gap between the shell and the outer cover after flowing through the first outer main flow passage. The refrigerant is supplied inside of the shell after flowing through the second outer main flow passage, then, flows on the coil surface in the widthwise direction (from the other end to the one end), and is drained from the draining pipe (in a state at the highest temperature).

The structure for cooling the coil surface and the outer surface of the shell using a so-called counter flow achieves an even cooling in the widthwise direction in addition to achieving an even cooling in the lengthwise direction, the temperature is equalized all over the coil unit, and the cooling efficiency increases much more than the conventional coil unit. As a result, a local temperature increase is prevented in the atmosphere around.

The refrigerant in the coldest state supplied inside the outer cover covers the refrigerant at the hottest state inside the shell just before being drained. Also, the refrigerant flowing inside the outer cover in a moderately cold state covers the refrigerant inside the shell in a moderately hot state (after cooling the coil) in the vicinity of the center in the widthwise direction. In this way, because the existence of the refrigerant inside the outer cover restrains the heat of the coil from transferring from the inside to the outside rationally, the temperature increase of the coil unit is reduced much more than the conventional coil unit.

Further, In the double cooling structure described above, an inner main flow passage may be formed on a side of the second outer main flow passage inside the shell while extending in the lengthwise direction, leads the refrigerant supplied from the second outer main flow passage into itself, and drains the refrigerant out on the surface of the coil inside the shell in the widthwise direction.

With this structure, when the flow of the refrigerant becomes uneven (disturbed) after the refrigerant has flown to the second outer main flow passage, because the inner main flow passage leads the refrigerant in the lengthwise direction again, and then leads out on the coil surface, the coil is cooled evenly.

A second inner main flow passage may be formed on a side of the first outer main flow passage inside the shell while extending in the lengthwise direction, receives the refrigerant having flown in the widthwise direction on the surface of the coil inside the shell, and drains the refrigerant from the draining pipe.

The refrigerant which has cooled the coil, and has become hot, should be drained outside as soon as possible, and the influence from the heat on the periphery should be restrained. With this structure, because the refrigerant in the high temperature state is promptly drained into the second inner main flow passage first, and does not stagnate in the periphery of the coil, a local high temperature state of the coil is prevented. Further, because the first outer main flow passage in the lengthwise direction into which the refrigerant in the coldest temperature state is led covers the second inner main flow passage in the lengthwise direction into which the refrigerant (in the hot state) is led, the heat transfer to the peripheral atmosphere and the machine mounting surface is restrained. As clearly stated above, the machine mounting surface for mounting this coil unit to an associated machine is provided on the outer periphery of the outer cover preferably on the side of the first outer main flow passage. This preference allows the first outer main flow passage to insulate the heat transfer from the coil.

In the invention described above, it is preferable to provide a supplying hole formed in the vicinity of one end in the lengthwise direction of the outer cover for supplying the first outer main flow passage with the refrigerant, a communicating hole formed in the vicinity of the other end in the lengthwise direction of the second outer main flow passage for supplying the refrigerant guided into itself into the shell, and the draining pipe for draining the refrigerant inside the shell at a position corresponding to a vicinity of the supplying hole inside the shell.

In this way, the refrigerant moves in a sequence of the supplying hole, the communicating hole, and the draining hole. It is a cooling structure where the refrigerant is supplied from the supplying hole, moves along diagonal lines of the coil unit, returns to a vicinity of the supplying hole again, and is drained from the draining pipe when viewed as a whole. Thus, an evener cooling effect is provided across the entire coil, and the temperature increase of the atmosphere around is restrained at an even higher level. Also, because the supplying side and the draining side are close to each other, the design for an outer piping becomes easy.

Further, it is preferable to provide the draining pipe so as to pass through a vicinity of the downstream side of the supplying hole in the first outer main flow passage. With this constitution, because the refrigerant flowing through the first outer main flow passage cools the outer peripheral surface of the draining pipe through which the refrigerant in the highest temperature state passes, the heat generated from the coil is recovered while a local temperature increase is restrained in the vicinity of the draining pipe on the coil unit, namely only the refrigerant inside the draining pipe is heated. The vicinity of the downstream side of the supplying hole approximately refers to a position inside the supplying hole in the lengthwise direction, and simultaneously close to the supplying hole.

As means for the first outer main flow passage for leading out the refrigerant in the widthwise direction on the outer surface of the shell, it is preferable to form a plurality of branch flow passages at a predetermined interval in the lengthwise direction on the first outer main flow passage, to use this the plurality of branch flow passages for individually branching the refrigerant led into the first outer main flow passage, and to lead out the refrigerant in the widthwise direction on the outer surface of the shell. There is no restriction on the number, the shape, the length, and the like of the branch flow passages, and any branch flow passages which can lead out the refrigerant in the widthwise direction can be essentially used.

Further, it is preferable to form sub-flow passages in the lengthwise direction at downstream ends of the branch flow passages for temporarily storing the refrigerant led out from the branch flow passages, and for leading out the refrigerant on the outer surface of the shell. With this structure, because the sub-flow passages diffuse the refrigerant led out from the individual branch flow passages in the lengthwise direction, and the refrigerant is led out on the outer surface of the shell while the pressure and the flow rate of the refrigerant are equalized in the lengthwise direction, the uniformity of the temperature distribution is increased on the outer peripheral surface of the coil unit. Because the branch flow passages or the sub-flow passages diffuses the pressure of the refrigerant in the lengthwise direction in the first main flow passage before the refrigerant flows in the widthwise direction, it is possible to decrease the thicknesses of the outer cover and the shell, and to constitute the coil unit relatively compact while the double cooling structure is adopted.

While the ideas describe above restrain the thermal influence from the coil unit on the atmosphere around and an associated machine as a major purpose, flowing the refrigerant in the opposite direction allows an application for increasing "heat radiation capability" of the coil unit.

Specifically, the coil unit used for a linear motor comprises a coil provided so as to oppose magnets of a linear motor, a shell for storing the coil inside while maintaining a predetermined gap, and for passing the refrigerant through the gaps for cooling the coil, an outer cover for storing the shell inside while maintaining second predetermined gaps, and for passing the refrigerant through the gaps for cooling the shell, a first guiding path, formed in the vicinity of one edge in the widthwise direction of the coil inside the shell while extending in the lengthwise direction, for leading the refrigerant supplied from the outside into itself, and for leading out the refrigerant in the widthwise direction on a surface of the coil, a second guiding path, formed in the vicinity of the other edge in the widthwise direction of the coil while extending in the lengthwise direction, for receiving the refrigerant having flown in the widthwise direction on the surface of the coil after the first guiding path, and for supplying the refrigerant into the second gap between the shell and the outer cover, and a draining hole for draining the refrigerant having flown on an outer surface of the shell to the outside.

Basically, this structure reverses the direction of the flow of the refrigerant (upstream/downstream) described above.

With this structure, because the refrigerant in the low temperature state cools the coil surface first, and then flows in the gap between the shell and the outer cover, the heat from the refrigerant is released outside. Because the coil is actively cooled, this structure suits especially to a case where it is required to restrain the temperature increase of the coil itself (rather than to restrain the temperature increase of the atmosphere around the coil unit) as much as possible in a high capacity linear motor. The entire description described above can inversely apply to the detailed structures.

DETAILED DESCRIPTION OF THE PREFERRED EMBODIMENTS

Figure 1:
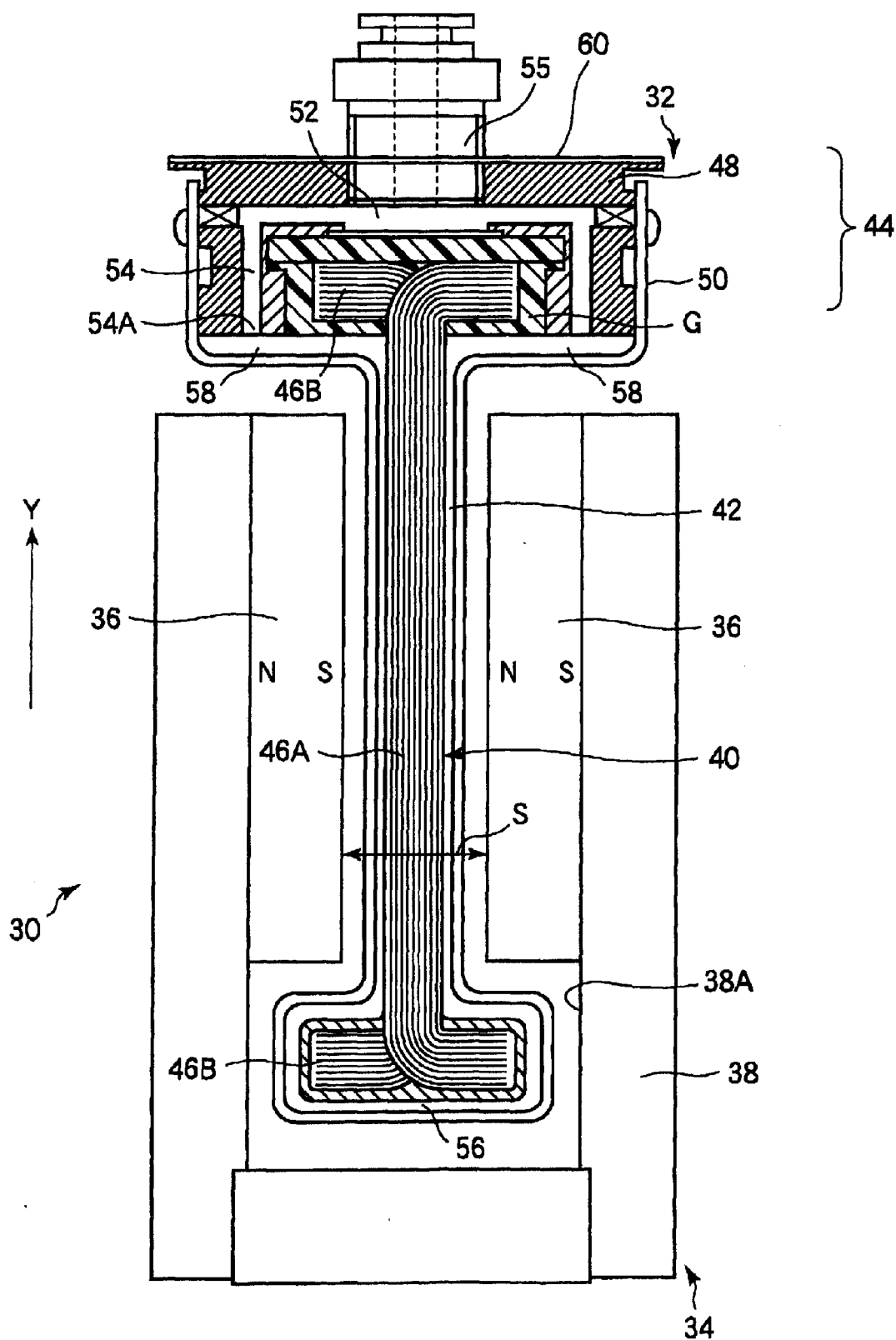
FIG. 1 is a sectional view showing a linear motor to which a coil unit according to a first embodiment of the present invention is applied.

Hereinafter, embodiments of the present invention will be described in detail by way of examples while referring to the drawings.

Figure 2:
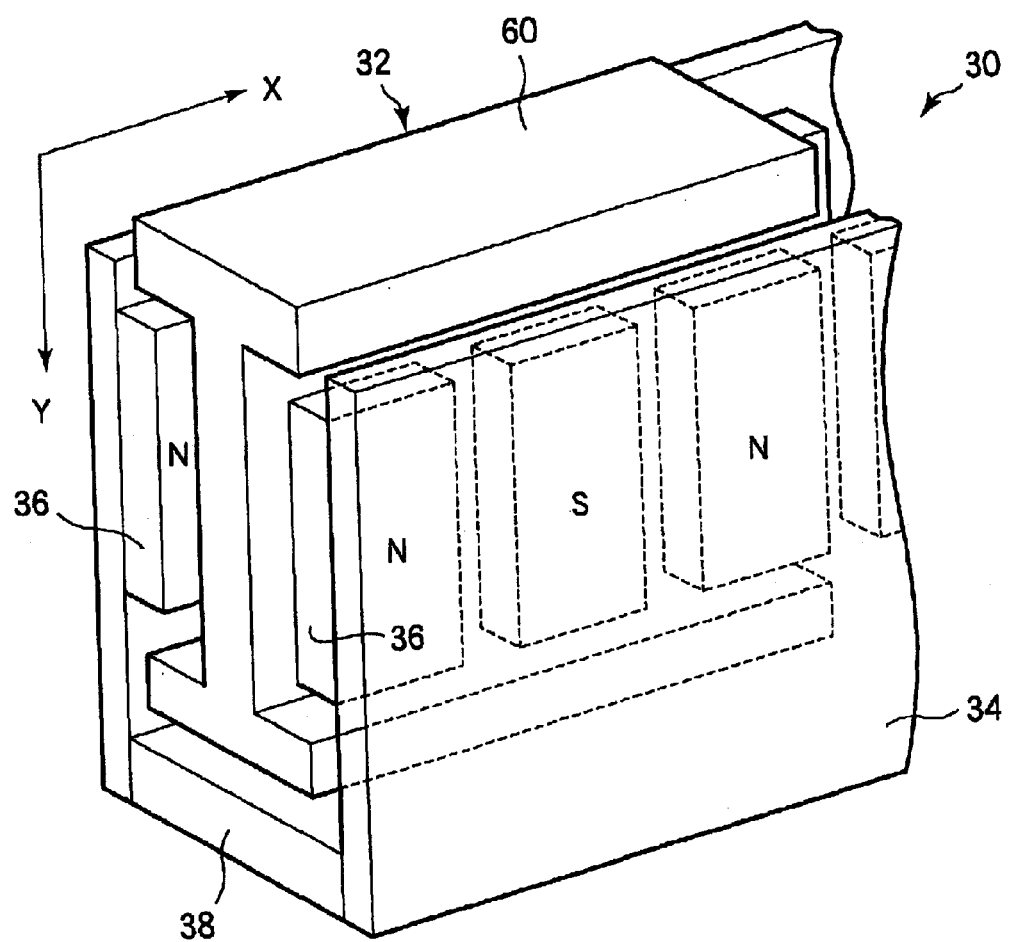
FIG. 2 is a perspective view partially showing the linear motor.

FIG. 1 and FIG. 2 show a coil unit 32 used for a linear motor 30 according to a first embodiment.

The coil unit 32 comprises a plate-shape coil 40 which is provided so as to oppose to magnets 36 of a magnet unit 34, and extends in a traveling direction X (see FIG. 2), and a shell 44 which stores the coil 40 inside while maintaining a predetermined gap 42 to the coil 40, and leads a refrigerant through the gap 42 for cooling the coil 40. The magnet unit 34 is provided with a base 38 whose cross section is in a U-shape, and the magnets 36 are installed on inner walls 38A of the base 38.

Figure 3:
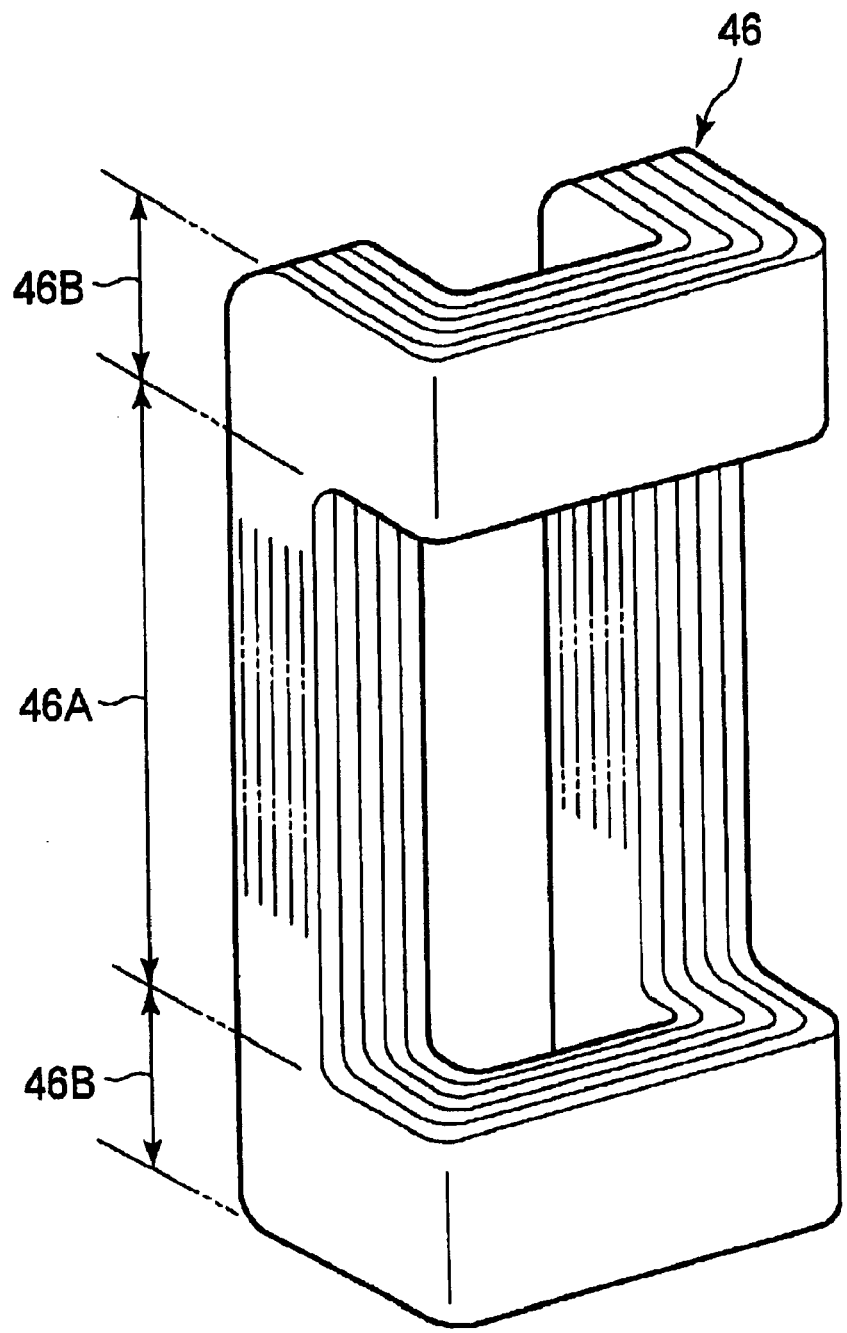
FIG. 3 is a perspective view showing a coil piece used for the coil unit.
Figure 4:
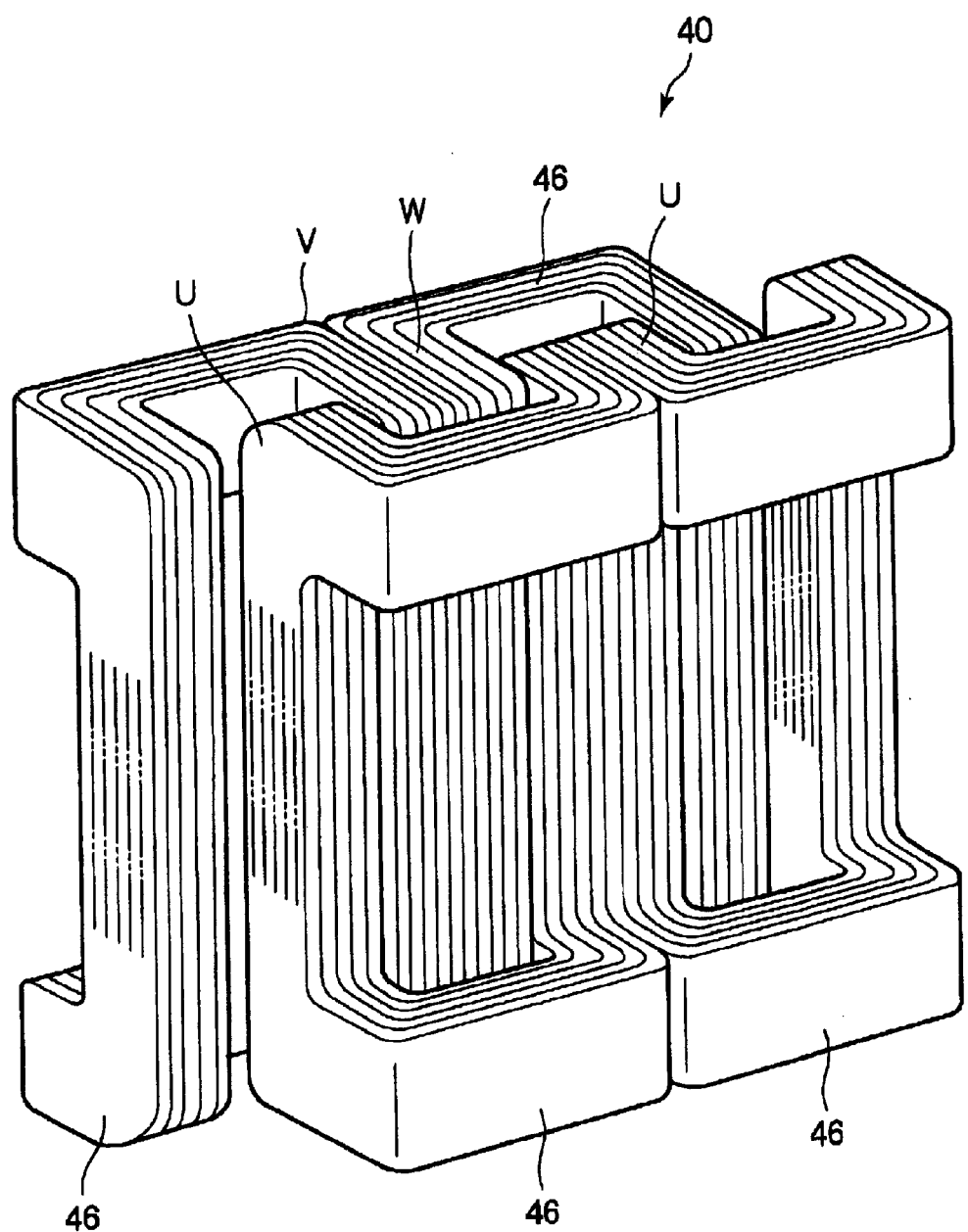
FIG. 4 is a perspective view showing a coil constituted while combining a plurality of coil pieces.

The plate-shape coil 40 has an l-shape (a saddle-shape) cross section orthogonal to the traveling direction X, and more specifically, the coil 40 is constituted while combining a plurality of coil pieces 46 shown in FIG. 3. A copper wire is wound into a ring shape to create the coil piece 46, and the coil piece 46 is formed so as to include straight parts 46A, and bent parts 46B formed on both ends of the straight parts 46A as a whole (in appearance). As shown in FIG. 4, the plurality of coil pieces 46 are combined with one another so as to overlap the straight parts 46A, and they are arranged as a U layer (phase), a V layer, a W layer . . . in the traveling direction X, and the coil 40 having the cross section in the l-shape is constituted. Because the coil pieces 46 are not connected with one another, and will be disassemble in this state, the coil 40 together with a coil holder 48 which extends in the lengthwise direction, and is placed on the side of one edge 40A in the widthwise direction Y are integrally molded with resin G as shown in FIG. 1.

The shell 44 is a member for storing the coil 40 inside, and comprises the coil holder 48 and a stainless plate 50 connected with the coil holder 48. The plate 50 is bent along the l-shape of the cross section of the coil 40, and forms the predetermined gap 42 at the straight parts 46A of the coil 40 while storing the coil 40 inside.

Figure 5:
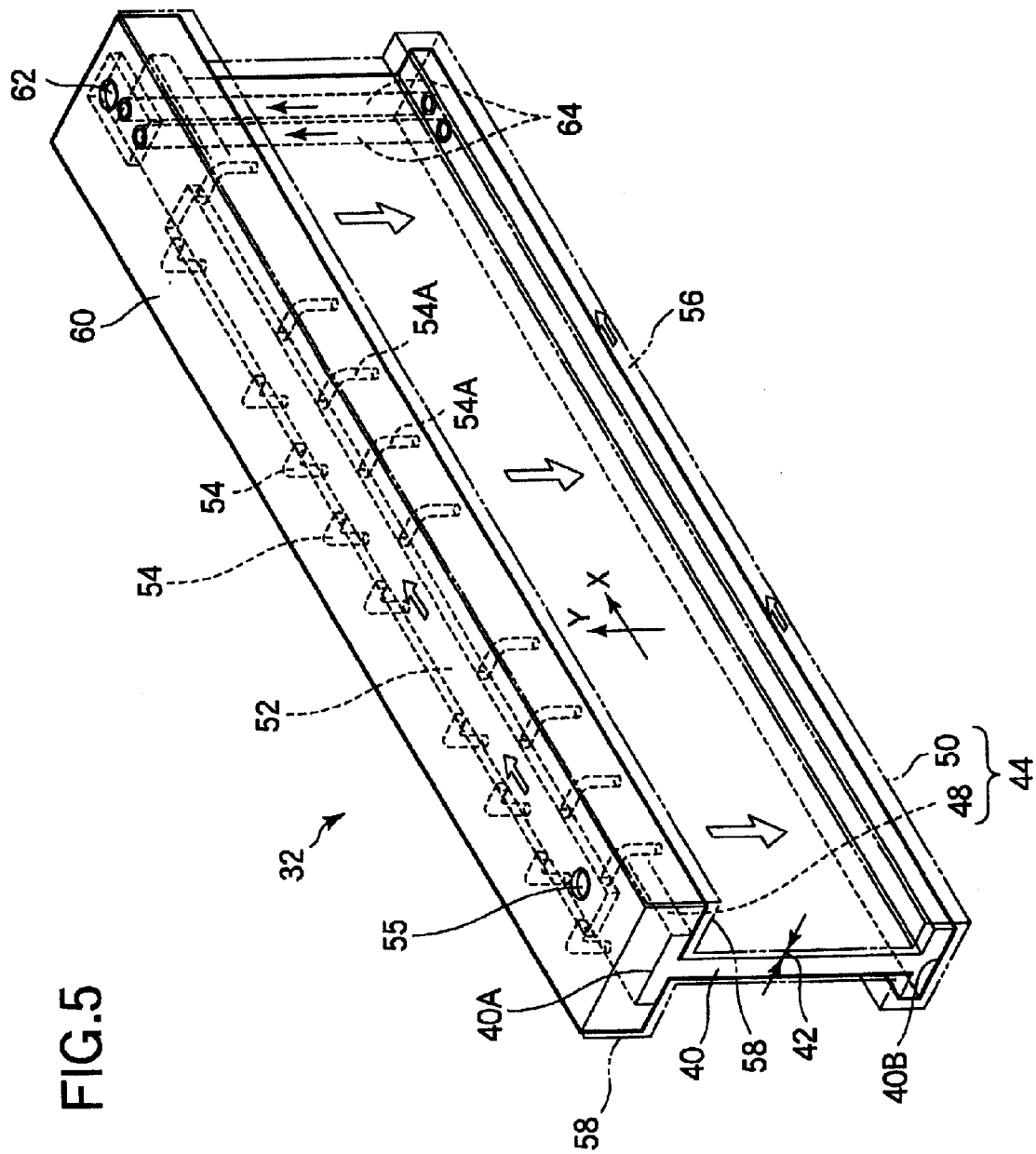
FIG. 5 is a perspective view showing a cooling structure for the coil unit.

The following section details a cooling structure for the coil 40 in the coil unit 32 while referring to FIG. 1 and FIG. 5.

A main flow passage 52 is formed in the vicinity of the one edge 40A in the widthwise direction of the coil 40. The main flow passage 52 extends inside the shell 44 (more specifically, inside the coil holder 48) in its lengthwise direction X (same as the traveling direction), and can leads a refrigerant supplied from a supplying port 55 opened on an outer peripheral surface of the shell 44 into itself, and store the refrigerant. Branch flow passages 54 are formed in the lengthwise direction X at a predetermined interval on the main flow passage 52 for leading out the refrigerant led into the main flow passage 52 in the widthwise direction Y. As a result, the refrigerant is led out from the branch flow passages 54 after flowing through the main flow passage 52, and flows in the widthwise direction Y in the gaps 42 between the shell 44 and the coil 40. Thus, the coil 40 is cooled along the widthwise direction Y. The main flow passage 52 and the branch flow passages 54 are formed as grooves on the coil holder 48 before the coil 40 is integrally molded with the resin G, and are constituted when the resin G is filled.

A second main flow passage 56 in the lengthwise direction X is formed in the vicinity of the other edge 40B in the widthwise direction Y of the coil 40 for receiving the refrigerant which has flown in the widthwise direction Y on a surface of the coil 40 (the gap 42). Specifically, the plate 50 is bent and formed such that a space around the bent parts 46B on the other edge 40B expands more than the gaps 42 formed at the straight parts 46A of the coil 40, and the space between the plate 50 and the bent part 46B constitutes the second main flow passage 56.

Sub-flow passages 58 are formed in the lengthwise direction on downstream ends 54A of the plurality of branch flow passages 54 for storing the refrigerant led out from the branch flow passages 54 as shown in FIG. 1. The sub-flow passages 58 connect the downstream ends 54A of the plurality of branch flow passages 54 one another particularly in the present embodiment. In this case, the sub-flow passages 58 are constituted such that spaces between the bent parts 46B on the one edge 40A of the coil 40, and the plate 50 expands as in the case of the second main flow passage 56. The sub-flow passages 58 store the refrigerant led out from the branch flow passages 54 again, and then lead out the refrigerant into the gaps 42.

A mounting surface 60 is formed on an outer peripheral surface of the shell 44 (the coil holder 48) opposite to (the one edge 40A of) the coil 40 through the main flow passage 52 for connecting the coil unit 32 with an associated member as shown in FIG. 1. Thus, the main flow passage 52 interposed between the mounting surface 60 and the coil 40 restrains the heat from the coil 40 from transferring to the mounting surface 60.

The supplying port 55 is opened on one end, and a draining port 62 is opened on the other end in the lengthwise direction X on the mounting surface 60 as shown in FIG. 5. Two draining pipes 64 are provided in the widthwise direction Y inside the shell 44 close to the draining port 62. One ends of the two draining pips 64 are opened on the side of the mounting surface 60 while continuing to the draining port 62, and the other ends communicate with the second main flow passage 56 in the shell 44. As a result, the refrigerant guided into the second main flow passage 56 is drained from the draining port 62 after flowing through the draining pipes 64.

Because the draining pipes 64 are provided inside the shell 44, the refrigerant led out after flowing through the main flow passage 52, the branch flow passages 54, and the sub-flow passages 58 flows on outer peripheral surfaces of the draining pipes 64 toward the second main flow passage 56. Thus, because the (continuously flowing) refrigerant covers the draining pipes 64, the heat from the heated refrigerant in the draining pipes 64 is restrained from transferring to the outside of the shell 44.

Next, an action of the coil unit 32 according to the first embodiment will be described.

The refrigerant supplied from the supplying port 55 is led in the lengthwise direction X along the main flow passage 52, and is stored. The refrigerant continuously supplied increases an inner pressure inside the main flow passage 52 so that the refrigerant is led out from the individual branch flow passages 54. If the pressure inside the main flow passage 52 is uniform, the refrigerant is led out from the individual branch flow passages 54 at almost equivalent flow rates. The refrigerant is led out from the downstream ends 50A after flowing through the branch flow passages 54, is temporally stored in the sub-flow passages 58, and expands in the lengthwise direction X of the coil 40 at once. Because the main flow passage 52 has already considerably equalized quantities of the refrigerant led into the sub-flow passages 58 in the lengthwise direction, the pressure of the refrigerant inside the sub-flow passage 58 is further equalized in the lengthwise direction. The refrigerant in the sub-flow passages 58 flows into the gaps 42 between the coil 40 and the shell 44, and flows in the widthwise direction Y. The refrigerant cools the coil 40 (gains the heat from the coil 40) after flowing through the gaps 42, flows into the second main flow passage 56, flows up in the draining pipes 64 when a pressure inside the second main flow passage 56 increases, and is drained from the draining port 62.

With this coil unit 32, because the refrigerant is led in in the lengthwise direction X of the coil 40 first, and then is branched toward the widthwise direction Y, the coil 40 is cooled evenly in the lengthwise direction X. As a result, it is prevented that the one end side in the lengthwise direction X (the downstream side) enters a local high temperature state as in the conventional structure.

When the flow rate of the refrigerant increases to increases the cooling capability, because the coil holder 48 forms the main flow passage 52 and the branch flow passages 54, these passages can sufficiently withstand the pressure of the refrigerant. On the other hand, the refrigerant in the main flow passage 52 flows into the sub-flow passages 58 in a "diffused pressure state" after flowing through the branch flow passages 54, it is not necessary to excessively increase the thickness of the plate 50 in the shell 44. Namely, the branch flow passages 54 serve as diffusing both the flow and the pressure of the refrigerant, and cooling the coil 40 highly efficiently (evenly), and decreasing the thickness of the shell 44 are realized simultaneously. As a result, because a distance S between the magnets 36 facing each other is reduced as shown in FIG. 1, and a larger driving force is obtained with a smaller power. When the coil unit 32 serves as a movable element, because the mass thereof is reduced, the response and the controllability of the driving increase.

Further, because the second main flow passage 56 is formed in the coil unit 32, the pressure of the refrigerant is evenly released in the second main flow passage 56. As a result, even pressure distributions in the lengthwise direction at individual positions are formed from the main flow passage 52 at a higher pressure to the second main flow passage 56 at a lower pressure, and the refrigerant flows actively and evenly in the widthwise direction Y. Thus, the coil 40 is cooled in an even state in the lengthwise direction X, and this structure especially suits to a coil including a large plate area (the dimension in the lengthwise direction X and/or the dimension in the widthwise direction Y).

Because the existence of the sub-flow passages 58 diffuses the pressure of the refrigerant led out from the branch flow passages 54 in the lengthwise direction X, and this structure makes the refrigerant flow from the "entire" sub-flow passages 58 into the gaps 42, even if the interval for providing the branch flow passages 54 is improper more or less, it is prevented that the coil 40 is cooled unevenly. Namely, the sub-flow passages 58 serve as a so-called buffer, cooling the coil 40 more evenly is achieved.

Because the main flow passage 52 to which the refrigerant "before" cooling the coil 40 is guided is interposed between the mounting surface 60 and the coil 40, the refrigerant in this low temperature state shields the heat from the coil 40, and the heat transfer to an associated machine connected with the mounting surface 60 is restrained. Also, because the refrigerant guided from the sub-flow passages 58 covers the outer peripheral surfaces of the draining pipes 64 from which the refrigerant "after" cooling the coil 40 is drained, the heat transfer from the draining pipes 64 to the outside of the shell 44 is restrained, and the temperature increase of the atmosphere around is reduced. Because both the supplying port 55 and the draining port 62 are provided on the side of the mounting surface 60, installing the linear motor 30 on an associated machine, and a designing a piping for cooling become simple.

Figure 6:
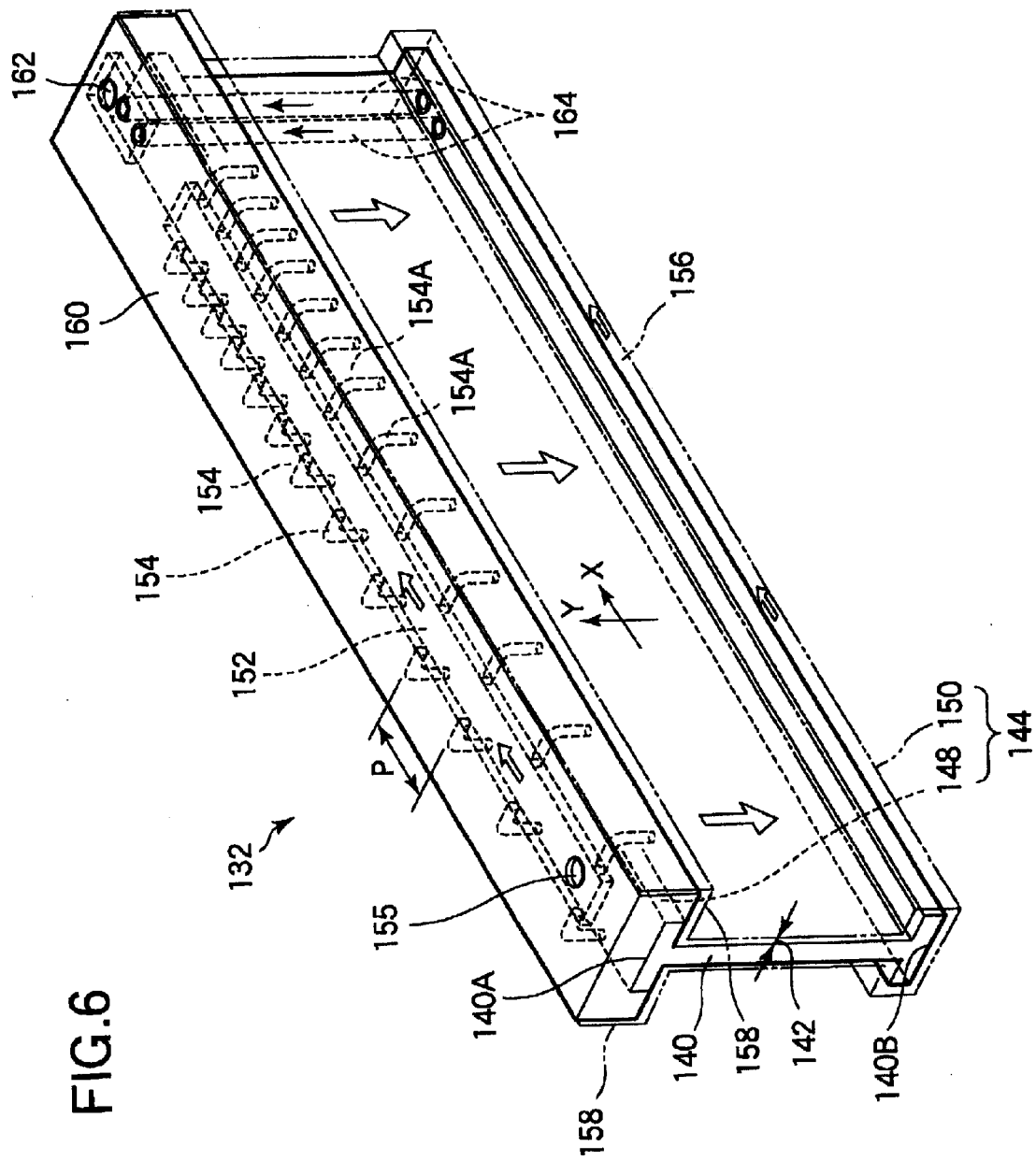
FIG. 6 is a perspective view showing a coil unit according to a second embodiment of the present invention.

The following section describes a coil unit 132 according to a second embodiment while referring to FIG. 6. The parts and members for which the following section does not provide descriptions are almost similar to those in the coil unit 32 according to the first embodiment, they have numerals with equal first and second least significant digits to those of the equivalent parts in the coil unit 32, and redundant descriptions on their constitutions and actions are omitted.

A predetermined interval P in the lengthwise direction X at which the plurality of branch flow passages 154 are formed is set to become gradually narrower from the upstream side to the downstream side of the refrigerant flowing through the main flow passage 152 (namely, from the supplying port 155 to the draining port 162) in the coil unit 132.

With this coil unit 132, even if the refrigerant guided into the main flow passage 152 in the lengthwise direction X looses pressure as it flows farther from the supplying port 155, because the interval for placing the branch flow passages 154 is set to narrower to compensate the pressure decrease, the flow rate of the refrigerant flowing over the coil 140 is equalized across the lengthwise direction X. Thus, it is prevented that a large amount of refrigerant flows only on the upstream side in the lengthwise direction X, and uneven cooling is generated.

It is preferable to set the placement interval P while a relationship with the cross section areas of the branch flow passages 54, and the cross section area of the main flow passage 152 is considered.

It is possible to set such that the cross section area of the branch flow passages 154 becomes gradually larger from the upstream side to the downstream side, or the gap 142 between the coil 140 and the shell 144 become gradually larger in addition to setting such that the placement interval P for the branch flow passages 154 gets gradually narrower as in the second embodiment, though they are not specifically shown as drawings. In this way, even if the pressure of the refrigerant decreases from the supplying port 155 toward the downstream side, the increased cross section area or the width of the gap compensates the decreased flow rate caused by the decreased pressure, and an even flow rate is obtained in the lengthwise direction X.

Further, it is possible to set such that the cross section area of the main flow passage increases from the upstream side to the downstream side to compensate the flow rate on the down stream side of the main flow passage.

Though the all embodiments of the present invention described above are provided with the second main flow passage, the sub-flow passages and the draining pipes, the present invention is not limited to the case provided with them, and simply includes a structure provided with the main flow passage and the branch flow passages to evenly cool the entire coil. There is no specific restriction on the number, the length, and the shape of the branch flow passages, and the branch flow passages may be formed as slits in the lengthwise direction.

The sub-flow passage simply diffuses the refrigerant led out from the branch flow passages in the lengthwise direction, independent sub-flow passages with predetermined lengths in the lengthwise direction X may be formed at the individual downstream ends of the branch flow passages, or sub-flow passages with predetermined lengths for connecting the downstream ends of a predetermined number of branch flow passages may be provided.

The idea of flowing the refrigerant in the widthwise direction Y of the coil takes account of a case for considering the entire coil as a whole. Namely, while the refrigerant actively flows in the lengthwise direction of the coil in the conventional case, the present invention actively flows the refrigerant in the widthwise direction, and includes cases which result in more or less deviations or stagnations in the flow of the refrigerant in the widthwise direction, and a generation of a flow in the lengthwise direction.

The following section details a third embodiment of the present invention.

FIG. 7 to FIG. 10 show a coil unit 232 used for a linear motor 230 according to the third embodiment.

The coil unit 232 is provided with a plate-shape coil 240 which is provided so as to oppose to magnets 236 in a magnet unit 234, and extends in the traveling direction X (see FIG. 8), a shell 244 which stores the coil 240 inside while a maintaining predetermined gap 242, and passes a refrigerant through the gap 242 to cool the coil 240, and an outer cover 264 which stores the shell 244 inside while maintaining a (second) predetermined gap 242B, and passes the refrigerant through the gap 242B to cool the shell 244. The magnet unit 234 includes a base 238 with a cross section in a U shape, and is structured such that the magnets 236 are attached on inner walls 238A of the base 238.

The plate-shape coil 240 has a cross section in an l shape (a saddle shape) orthogonal to the traveling direction X as the embodiments described above. The constitution of the coil pieces 246 is also the same as the embodiments described above.

The shell 244 is a member which stores the coil 240 inside, and is provided with a coil holder 248, and stainless plates 250 connected with the coil holder 248. The plate 250 is bent along the l shape of the cross section of the coil 240, and forms the predetermined gap 242 at straight parts 246A of the coil 240 while storing the coil 240 inside.

The outer cover 264 is a member for storing the shell 244 inside, and is structured such that an outer lid 266 which is attached on an outer side in the widthwise direction Y of the coil folder 248, and extends in the traveling direction X, and a stainless outer plate 268 which is connected with the outer lid 266 are provided. The outer plate 268 is bent along the plate 250 of the shell 244, and forms the predetermined gap 242B (corresponding to the straight parts 246A of the coil 240) while storing the shell 244 inside.

Figure 8:
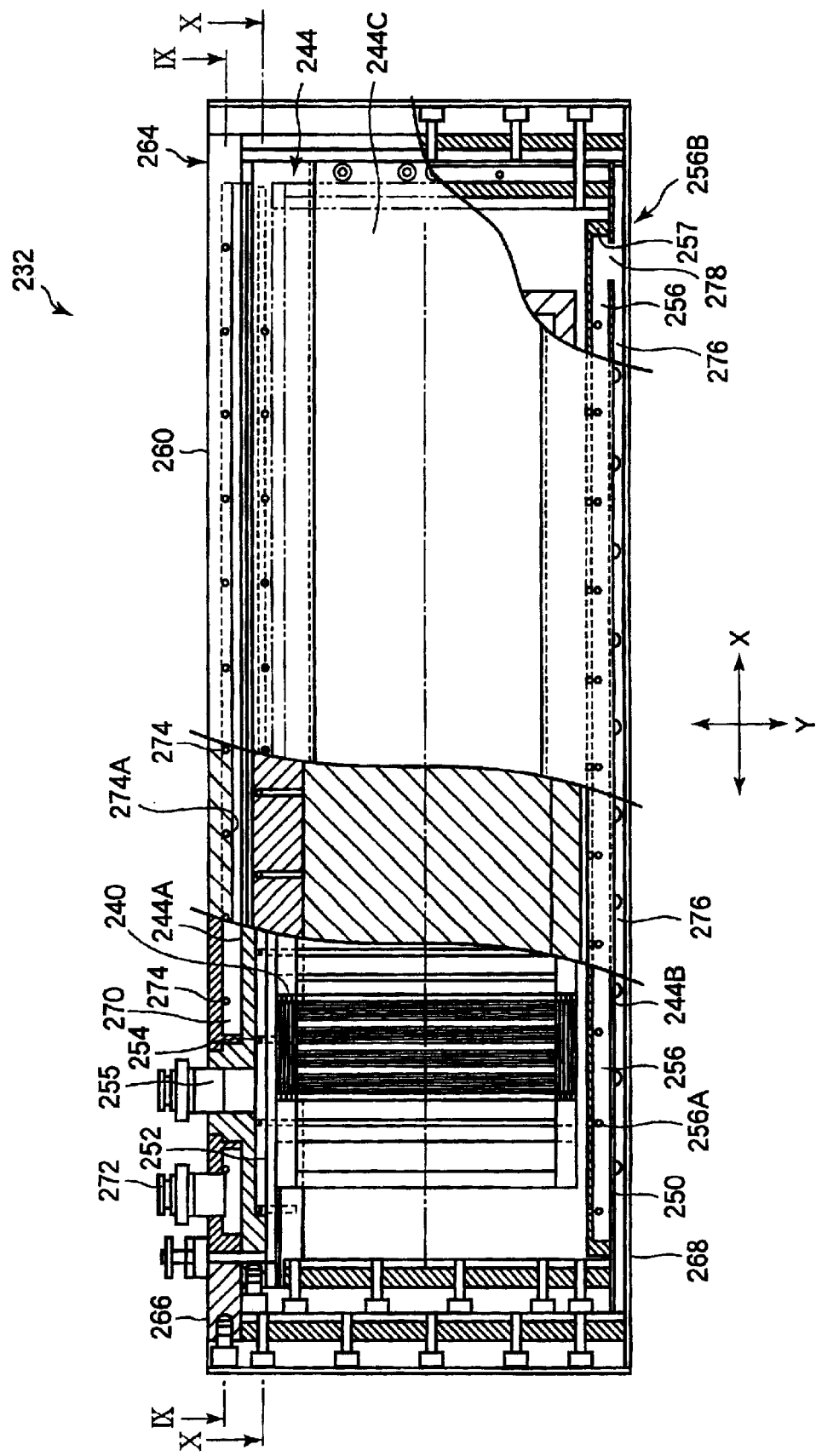
FIG. 8 is a partial sectional view showing a cooling structure of the coil unit.
Figure 9:
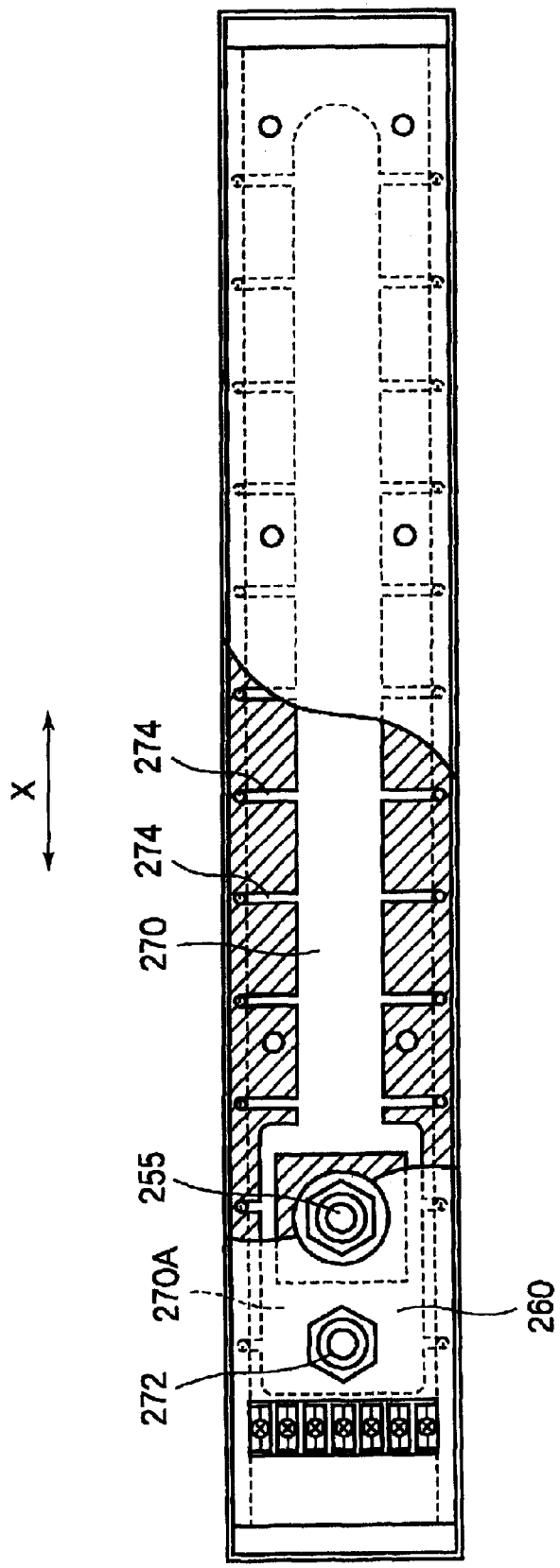
FIG. 9 is a sectional view taken along a line XI—XI in FIG. 8.
Figure 10:
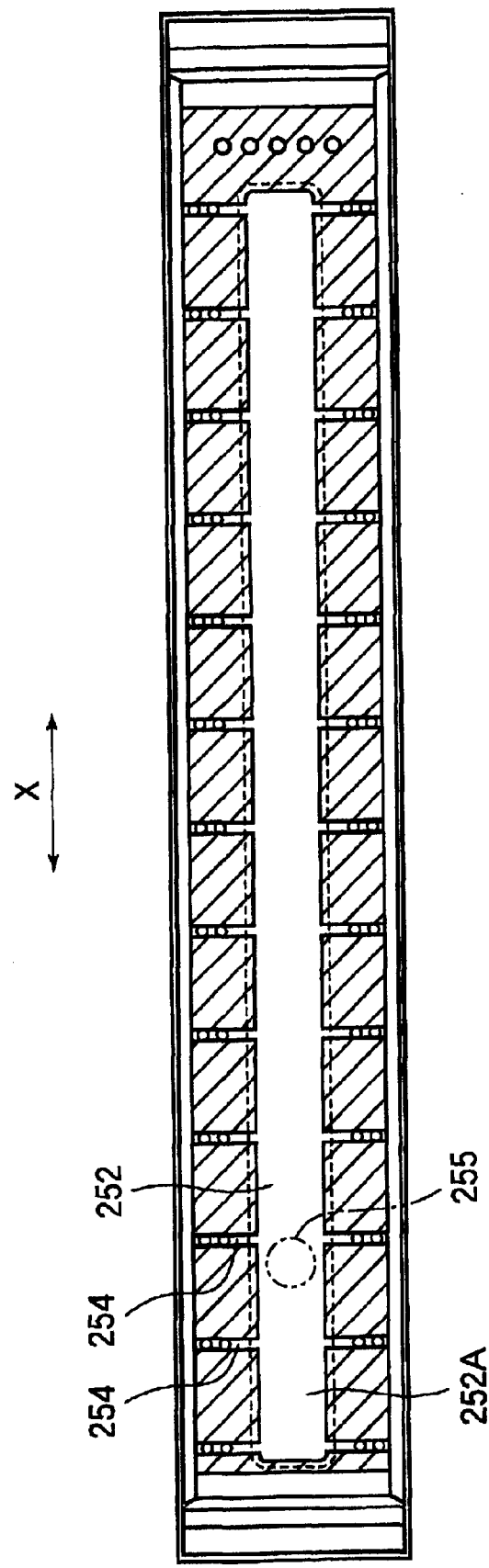
FIG. 10 is a sectional view taken along a line X—X in FIG. 8.

The following section details a cooling structure for a coil 240 in the coil unit 232 while referring to FIG. 8 to FIG. 10.

A first outer main flow passage 270 extending in the lengthwise direction (same as the traveling direction) X is formed in the vicinity of one edge 244A in the widthwise direction of the shell 244 inside the outer cover 264 as shown in FIG. 8 and FIG. 9. A supplying hole 272 is formed in the vicinity of one end 270A in the lengthwise direction of the first outer main flow passage 270 for supplying the refrigerant into the first outer main flow passage 270, and the first outer main flow passage 270 guides the refrigerant supplied from the supplying hole 272 in the lengthwise direction X.

A plurality of branch flow passages 274 are formed at a predetermined interval in the lengthwise direction X on the first outer main flow passage 270. The branch flow passages 274 branch the refrigerant led into the first outer main flow passage 270, and the refrigerant flows in the widthwise direction Y on an outer surface 244C of the shell 244 (the gap 242B).

A second outer main flow passage 276 extending in the lengthwise direction X is formed in the vicinity of the other edge 244B in the widthwise direction of the shell 244 inside the outer cover 264. The second outer main flow passage 276 receives the refrigerant which has flown in the widthwise direction Y on the outer surfaces 244C of the shell 244 (in the gaps 242B) after having flown through the first outer main flow passage 270 and the branch flow passages 274, and supplies the refrigerant inside the shell 244. The second outer main flow passage 276 is formed by expanding the gap between the plate 250 and the outer plate 268 (wider than the gap 242B in the vicinity of the straight parts 240A of the coil 240).

Figure 7:
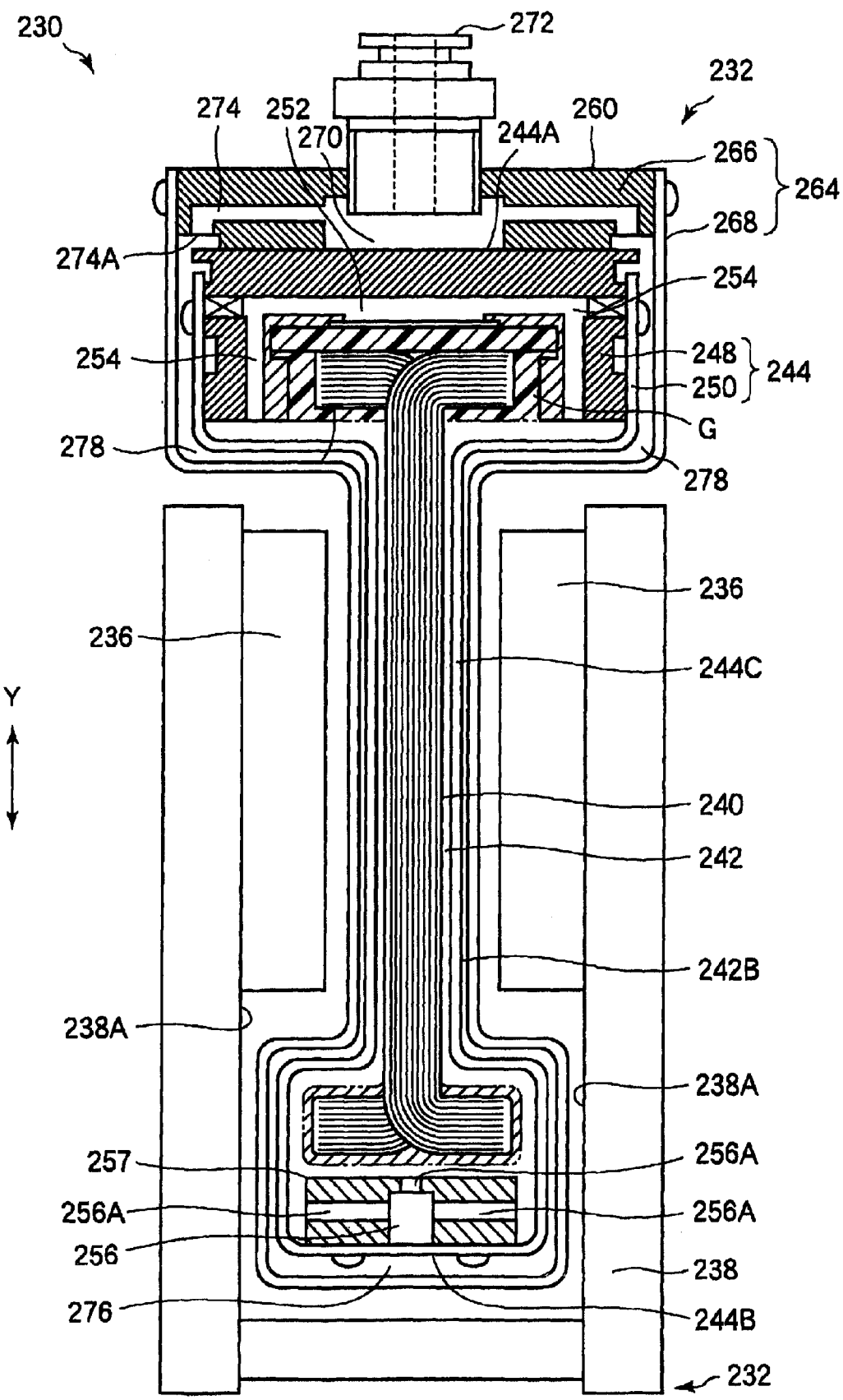
FIG. 7 is a sectional view showing a linear motor to which a coil unit according to a third embodiment of the present invention is applied.

Sub-flow passages 278 are formed in the lengthwise direction X at downstream ends 274A of the branch flow passages 274 for temporally storing the refrigerant led out from the branch flow passages 274 (see FIG. 7). The sub-flow passage 278 stores the refrigerant, has a structure to lead out the refrigerant into the gap 242B, and serves as a so-called buffer. The sub flow passage 278 is formed by expanding the gap between the plate 250 and the outer plate 268 wider than the gap 242B.

An inner wall of the outer lid 266 is cut to form grooves, and the grooves constitute the first main flow passage 270 and the branch flow passages 274 when the outer lid 266 is attached to the coil holder 248.

Next, a cooling structure inside the shell 244 will be described.

An inner main flow passage 256 extending in the lengthwise direction X is formed inside the shell 244 on the side of the second outer main flow passage 276 as shown in FIG. 8. Namely, the second outer main flow passage 276 and the inner main flow passage 256 are provided in parallel with each other. A communicating hole 278 is formed at the other end 256B in the lengthwise direction X (namely, on the side opposite to the supplying hole 272 in the lengthwise direction X) on the second outer main flow passage 276 and the inner main flow passage 256 for connecting them, and the refrigerant guided through the second outer main flow passage 276 is supplied into the inner main flow passage 256 through the communicating hole 278. A groove is formed on a flow passage forming member 257 provided inside the shell 244 in the lengthwise direction X to constitute this inner main flow passage 256.

A plurality of inner branch flow passages 256A are formed at a predetermined interval in the lengthwise direction X on the inner main flow passage 256, and the refrigerant guided in the lengthwise direction X through the inner main flow passage 256 is led out in the widthwise direction Y on the surface of the coil 240 (into the gap 242) through the inner branch flow passages 256A. More specifically, the inner branch flow passages 256A are formed in three directions at every predetermined interval (see FIG. 7), and the refrigerant led out from each of them flows toward the gaps 242.

A second inner main flow passage 252 for receiving the refrigerant which has flown in the widthwise direction Y on the surface of the coil 240 is formed on the side of the first outer main flow passage 270 in the shell 244 as shown in FIG. 10. Pores 254 are formed at a predetermined interval in the lengthwise direction X on the second inner main flow passage 252 (see FIG. 7), and the refrigerant which has flown on the surfaces of the coil 240 flows into the second inner main flow passage 252 through the plurality of pores 254. Further, a draining pipe 255 for draining the refrigerant collected by the second inner main flow passage 252 is formed on one end 252A in the lengthwise direction X on the second inner main flow passage 252. More specifically, the draining pipe 255 passes through a vicinity on the downstream side of the supplying hole 272 on the first outer main flow passage 270, and opens on the side of the outer lid 266. Namely, the first outer main flow passage 270 surrounds the draining pipe 255 (see FIG. 9).

The coil holder 248 is cut to form the second inner main flow passage 252 and the pores 254 before the coil 240 is integrally molded.

The following section describes an action of this coil unit 232.

The first outer main flow passage 270 guides the refrigerant supplied from the supplying hole 272 in the lengthwise direction X. When the pressure in the first outer main flow passage 270 increases, the refrigerant flows into the sub-flow passages 278 through the branch flow passages 274. Because the function of the first outer main flow passage 270 considerably equalizes the quantities of the refrigerant led into the sub-flow passages 278 from the individual branch flow passages 274 in the lengthwise direction X, the pressure of the refrigerant inside the sub-flow passages 278 is further equalized in the lengthwise direction X. Then, the refrigerant in the sub-flow passages 278 flows into the gaps 242B in the widthwise direction Y.

The refrigerant which has cooled outer surfaces 244C of the shell 244 while flowing through the gaps 242B flows into the second outer main flow passage 276, and is guided in the lengthwise direction X. The refrigerant is supplied from the communicating hole 278 into the inner main flow passage 256, and is guided in a direction opposite to the guiding direction of the second outer main flow passage 276. When the pressure of the refrigerant in the inner main flow passage 256 increases, the refrigerant flows out from the inner branch flow passages 256A, and fills the inside of the shell 244. The refrigerant cools the coil 240 along the widthwise direction Y, and then flows into the second inner main flow passage 252 through the pores 254. The refrigerant which has flown into the second inner main flow passage 252 is guided in the lengthwise direction X, and is drained from the draining pipe 255.

The coil unit 232 has a double structure for covering the coil 240 with shell 244 and the outer cover 264. Further, after the first outer main flow passage 270 and the inner main flow passage 256 guide (diffuse) the refrigerant in the lengthwise direction X, then the refrigerant flows in the widthwise direction Y. Thus, counterflows are relatively formed in the widthwise direction Y in the individual gaps 242 and 242B.

The diffusion in the lengthwise direction X, and the counterflows in the widthwise direction Y of the refrigerant achieve even cooling in both the lengthwise direction and the widthwise direction, and the temperature is equalized across the entire coil unit 232. As a result, the cooling efficiency increases largely without increasing the flow rate of the refrigerant compared with the conventional case.

For example, according to an analysis result by the inventors, the temperature increase is restricted to about 0.45° C. on the coil unit 232 of the third embodiment while the temperature on the outer surface of the conventional coil unit increases by about 2.5° C. where it is assumed that the heat generating quantity of the coil is 200 (W), and the flow rate of the refrigerant is 2 (l/min). While the analysis results depend on the material of the shell and the type of the refrigerant, extremely excellent results are achieved in any cases.

Especially, the refrigerant flowing through the gaps 242B between the outer cover 264 and the shell 244 efficiently shields the influence of the heat transfer of the coil 240 to the outside, and a structure where the refrigerant in the coldest state covers the part with the highest temperature on the shell 244 is provided. Because the low temperature refrigerant which just starts flowing through the gaps 242B on the outer side covers the high temperature refrigerant just before the collection in the shell 244, the heat transfer quantity to the outer atmosphere is largely reduced in addition to the increase of the cooling efficiency for the coil 240.

When the refrigerant flows in the widthwise direction Y in the gaps 242B, and the flow of the refrigerant is disturbed, because the second outer main flow passage 276 collects the refrigerant, and the inner main flow passage 256 guides the refrigerant in the lengthwise direction X, an even flow is formed in the gaps 242 on the surface of the coil 240 in the lengthwise direction X. Further, because the refrigerant which is in a high temperature state after cooling the coil 240 is quickly collected into the second inner main flow passage 252 through the pores 254, a stagnation of the refrigerant on the coil 244 is prevented, and a local high temperature state is restrained. With this respect, it is preferable to form as many pores 254 as possible, and the pores 254 may be formed as slits to expand the flow passage cross section area of the pores 254.

Because the first outer main flow passage 270 (to which the refrigerant in the coldest state is led in) is interposed between the mounting surface 260 and the coil 240, the heat transfer quantity to the mounting surface 260 is restrained, and the thermal expansion of an associated machine is largely reduced.

Further, because the refrigerant moves in a sequence of the supplying hole 272, the communicating hole 278, and the draining pipe 255 in the third embodiment, counterflows are formed in the lengthwise direction X as a whole. Especially, the counterflows are apparently formed between the first outer main flow passage 270 and the second inner main flow passage 252, and between the second outer main flow passage 276 and the inner main flow passage 256, and the counterflows achieve an even cooling in the lengthwise direction X. Also, because the supplying hole 272 and the draining pipe 255 are close to each other, piping design on the outside becomes very simple.

Though the refrigerant in the highest temperature state passes through the draining pipe 255, because the first main flow passage 270 covers around the draining pipe 254 (see FIG. 9), the heat transfer from the draining pipe 255 to the mounting surface 260 is reduced, and the reduced heat transfer reduces the thermal expansion of an associated machine.

Figure 11:
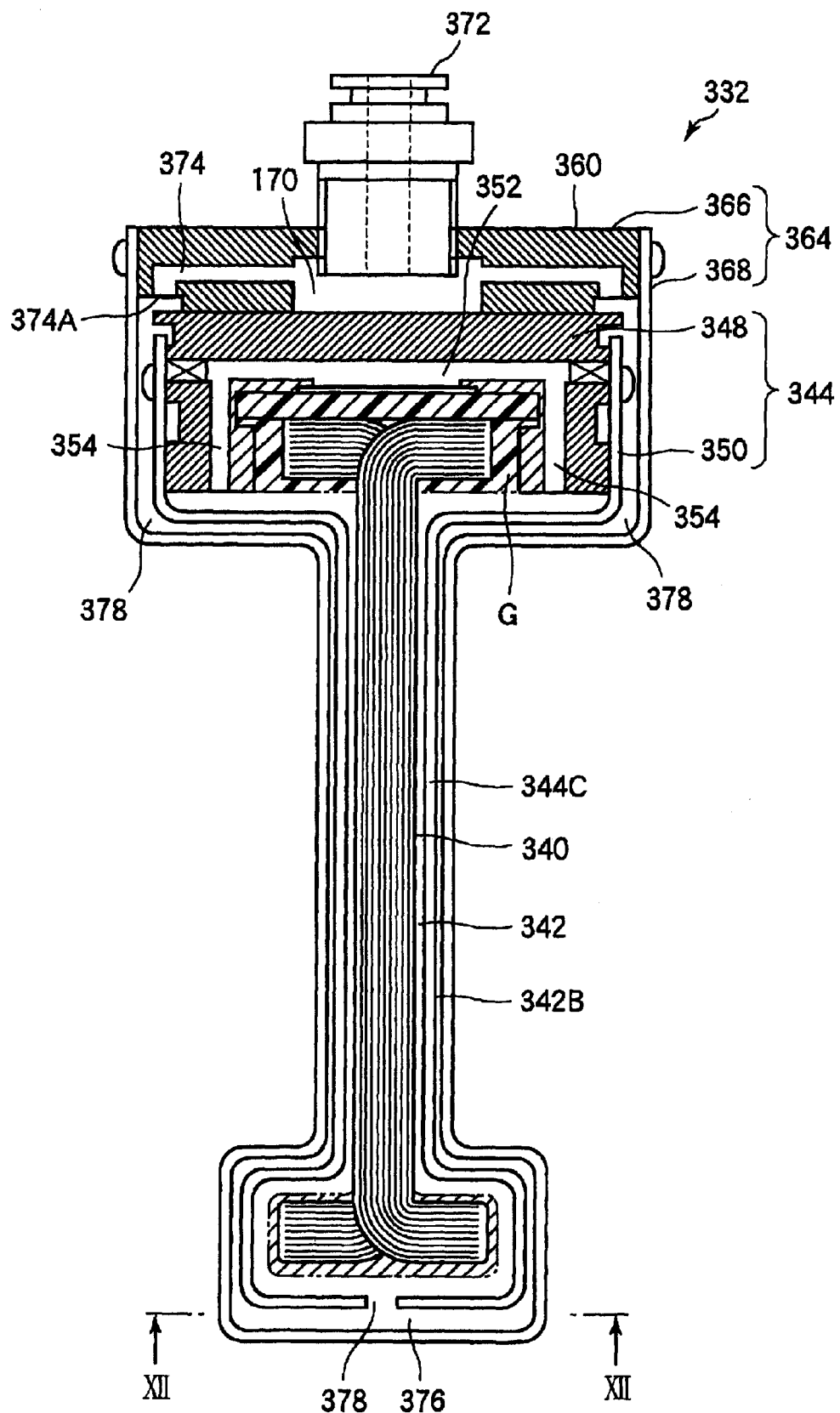
FIG. 11 is a sectional view showing a coil unit according to a forth embodiment of the present invention.
Figure 12:
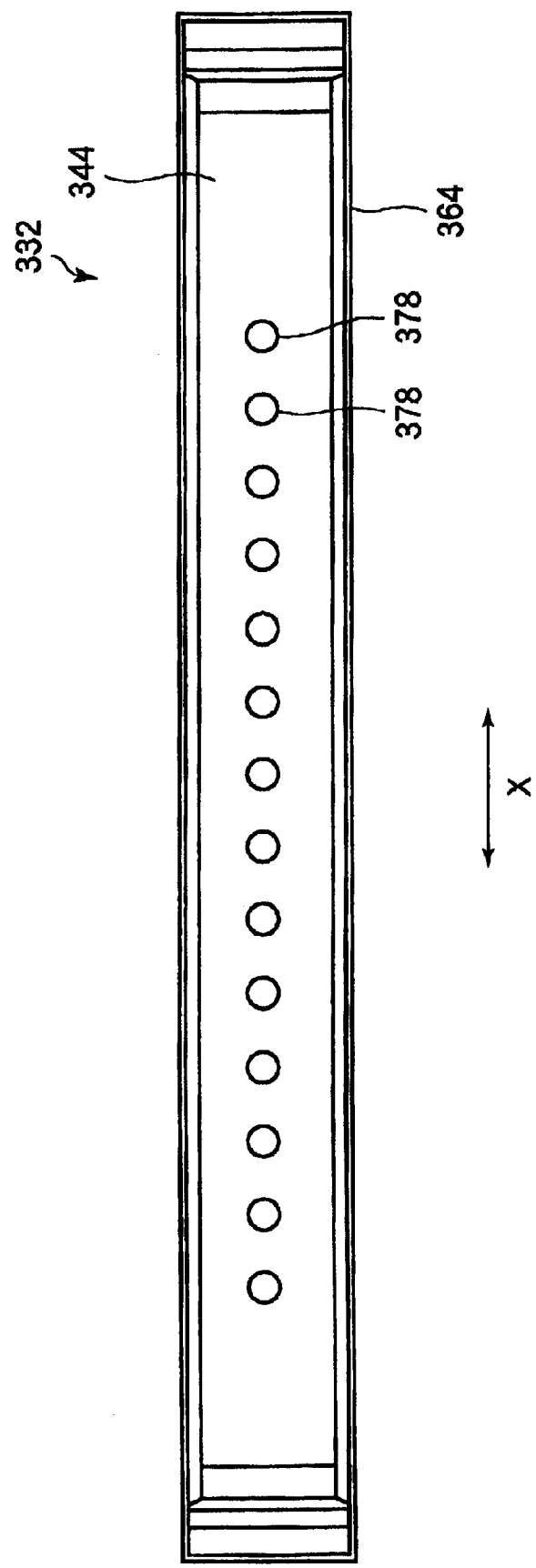
FIG. 12 is a sectional view taken along a line XII—XII in FIG. 11.
Figure 13:
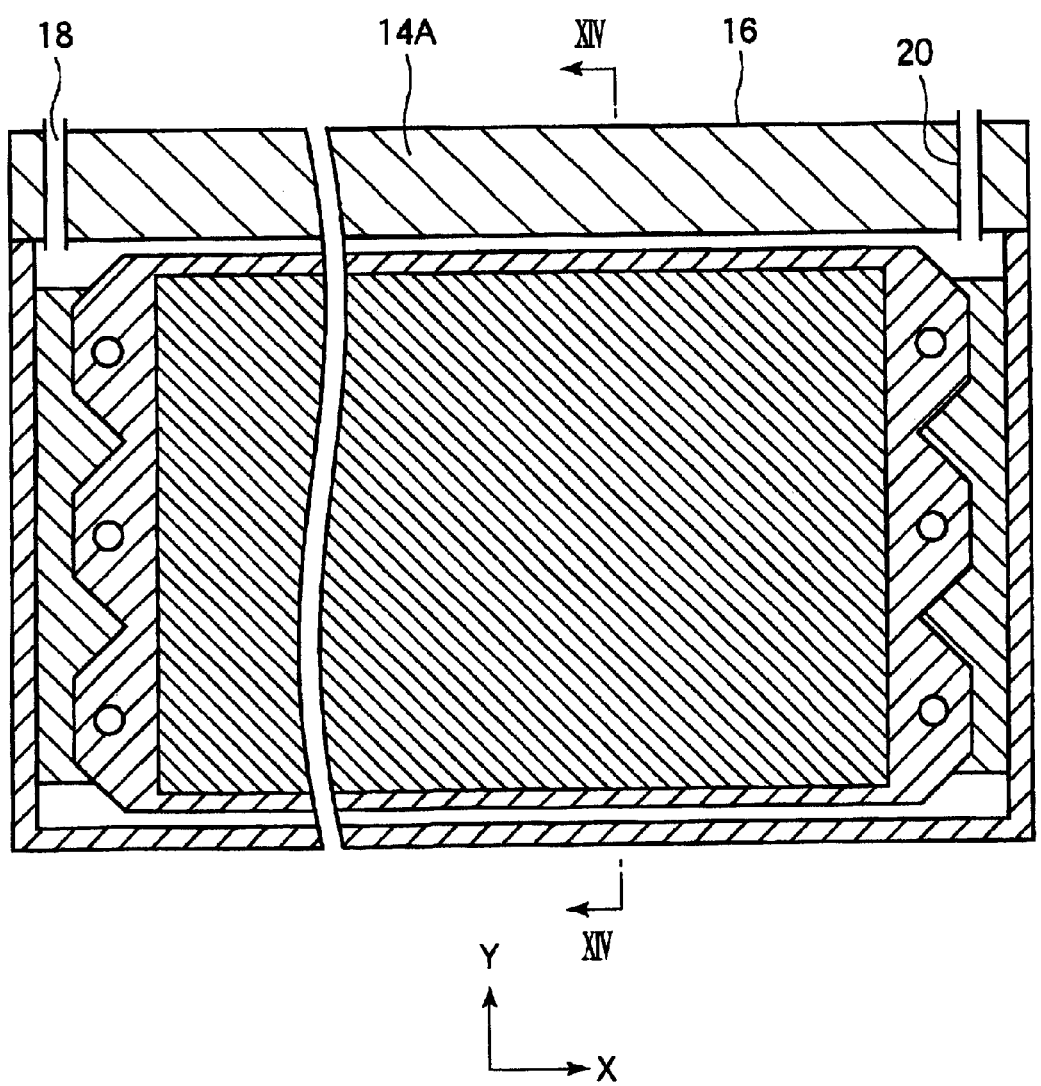
FIG. 13 is a sectional view showing a conventional linear motor.
Figure 14:
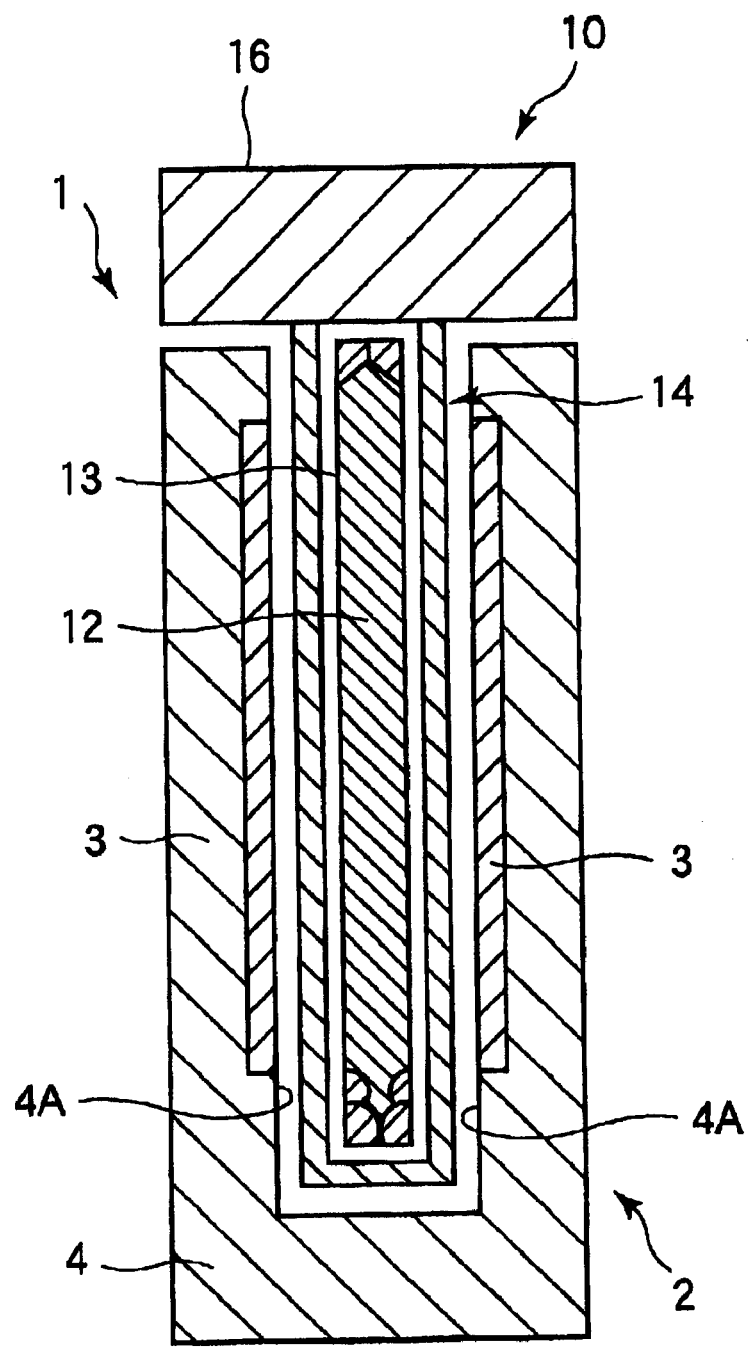
FIG. 14 is a sectional view taken along a line XIV—XIV in FIG. 13.
Figure 15:
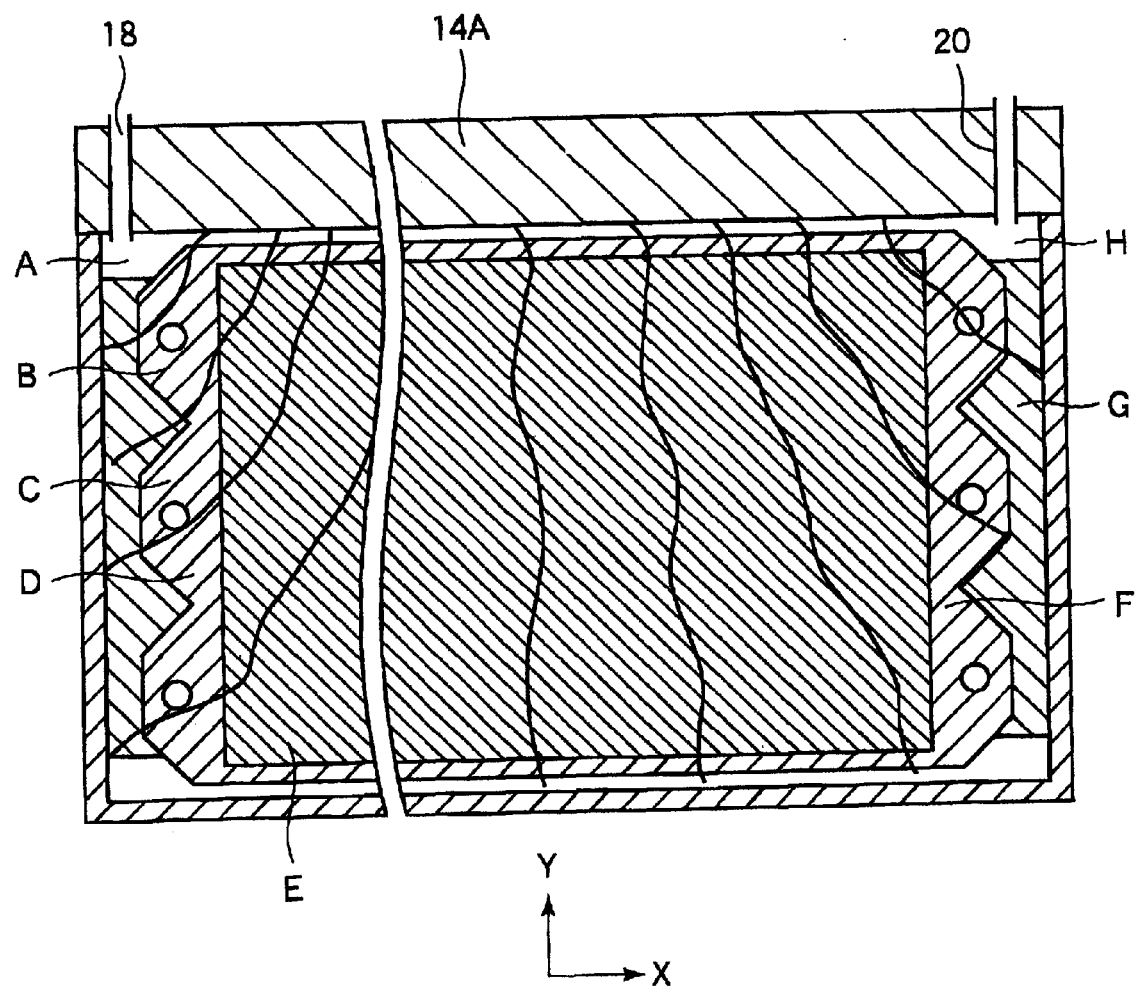
FIG. 15 is schematic diagram showing a diffusing state of a refrigerant in a coil unit for the linear motor.

Next, a coil unit 332 according to a fourth embodiment of the present invention will be described while referring to FIG. 11 and the FIG. 12. The parts and members for which the following section does not provide descriptions are almost similar to those in the coil unit 232 according to the third embodiment, they have numerals with equal first and second least significant digits to those of the equivalent parts in the coil unit 232, and redundant descriptions on their constitution and the actions are omitted.

A plurality of communicating holes 378 for supplying a refrigerant inside a shell 344 are formed at a predetermined interval in a lengthwise direction X in a second outer main flow passage 376 in the coil unit 332. The second outer main flow passage 376 can directly supply the refrigerant into gaps 342 through these communicating holes 378. Thus, the inner main flow passage 256 is not formed in the coil unit 232 of the third embodiment (it can be viewed as the second outer main flow passage 376 serves as the inner main flow passage).

The first outer main flow passage 370 guides the refrigerant in the lengthwise direction X, and the refrigerant is led out in the widthwise direction Y through branch flow passages 374 as well in this coil unit 332. Further, the refrigerant is led out in the widthwise direction Y through the plurality of communicating holes 378 in the second outer main flow passage 376. Thus, diffusion in the lengthwise direction X and counterflows in the widthwise direction Y of the refrigerant provide an almost equivalent effect to that in the third embodiment, and an inner structure simpler than that in the third embodiment.

While the third embodiment and the forth embodiment described above show cases where the branch flow passages and communicating holes are provided in the lengthwise direction at an equivalent interval, they are not limited to those cases. Also, there is no specific restriction on the length and the shape of the branch flow passages and the communicating holes.

The idea of flowing the refrigerant in the widthwise direction Y in the present invention takes account of a case for viewing the entire coil unit as a whole. Namely, while the conventional coil unit actively flows the refrigerant in the lengthwise direction, the present invention actively flow the refrigerant in the widthwise direction, and includes cases result in more or less deviations and stagnations in the flow of the refrigerant in the widthwise direction.

While the coil units described above put an emphasis on preventing the influence of the heat transfer to the outside of the coil, if the refrigerant flows in the opposite direction (flows backward) in this structure, a heat radiation structure for reducing a temperature increase of the coil itself as much as possible is obtained.

Specifically, the draining pipe 255 can be made as a supplying pipe, the second inner main flow passage 252 can be made as a first guiding path, the inner main flow passage 256 can be made as a second guiding path, and the supplying hole 272 can be made as a draining hole in the coil unit 332 shown in FIG. 8, for example. In this way, the first guiding path (the second inner main flow passage 252) guides the refrigerant supplied from the supplying pipe (the draining pipe 255) in the lengthwise direction X, and the refrigerant is led out in the widthwise direction Y on the surface of the coil 240 through the pores 254. The second guiding path (the inner main flow passage 256) receives the refrigerant after cooling the coil 240, and the refrigerant is led out into the gaps 242B between the shell 244 and the outer cover 264. Because the outer cover 264 efficiently release the heat to the outside, the refrigerant actively cools the coil 240, and is finally drained from the draining hole (the supplying hole 272).

With the coil unit according to the present invention, the coil is evenly cooled both in the lengthwise direction and the width wise direction, and the influence on the outside from the local temperature increase is reduced. Also, because the thickness of the shell is reduced, the driving efficiency and the controllability of the linear motor increase.

What is claimed is:

1. A coil unit comprising:
    a shell for a linear motor, the shell storing a coil therein while maintaining a predetermined gap between the shell and the coil, and for using a refrigerant to cool the coil;
    a main flow passage, formed inside the shell and extending in a lengthwise direction of the coil, the main flow passage leading the refrigerant supplied from outside of the shell through the main flow passage; and
    a plurality of branch flow passages extending from the main flow passage at a predetermined interval in the lengthwise direction for draining the refrigerant from the main flow passage in a widthwise direction of the coil,
    wherein the refrigerant drained from the branch flow passages, after flowing through the main flow passage, flows through the predetermined gap maintained between the shell and the coil.

2. The coil unit for a linear motor according to claim 1, further comprising a second main flow passage extending in the lengthwise direction, wherein said main flow passage extending in the lengthwise direction of the coil is provided in the vicinity of one edge in the widthwise direction of the coil, and said second main passage is formed in the vicinity of the other edge in the widthwise direction of the coil for receiving the refrigerant having flown on a surface of the coil in the widthwise direction.

3. The coil unit for a linear motor according to claim 1, further comprising a sub-flow passage in the lengthwise direction of said coil, formed at a downstream ends of said branch flow passages, for temporarily storing the refrigerant led out from the branch flow passages, and for draining the refrigerant on the surface of the coil.

4. The coil unit for a linear motor according to claim 1, further comprising a mounting surface for connecting said coil unit with an associated member wherein said main flow passage extending in the lengthwise direction of the coil is provided in the vicinity of one edge in the widthwise direction of the coil, the mounting surface is formed on an outer peripheral surface of said shell on a side opposite to the coil through the main flow passage, and the main flow passage interposed between the mounting surface and the coil restrains heat from the coil from transferring to the mounting surface.

5. The coil unit for a linear motor according to claim 1, wherein said predetermined interval in the lengthwise direction for forming said plurality of branch flow passages is set to become narrower from an upstream side to a downstream side of said refrigerant flowing through said main flow passage.

6. The coil unit for a linear motor according to claim 1, wherein at least either one of the width of said gaps between said coil and said shell, and the cross section area of said branch flow, passages is set to become larger from the upstream side to the downstream side of said refrigerant flowing through said main flow passage.

7. The coil unit for a linear motor according to claim 2, further comprising a draining pipe in the widthwise direction including one end opened on an outer peripheral surface on a side of said main flow passage of said shell, and the other end for communicating with said second main flow passage wherein said refrigerant guided into said second main flow passage is drained through said draining pipe, and said refrigerant flows on the surface of said draining pipe from said main flow passage side to said second main flow passage side to restrain heat from said draining pipe from transferring to said shell.

8. A coil unit for a linear motor comprising:
   a shell for storing a coil of the coil unit inside while maintaining a predetermined gap to the coil, and for using a refrigerant to cool the coil;
   an outer cover for storing the shell inside while maintaining a second predetermined gap, and for passing the refrigerant through the second gap for cooling said shell;
   a first outer main flow passage, formed in the vicinity of one edge in the widthwise direction of the shell inside the outer cover while extending in the lengthwise direction, for leading the refrigerant supplied from the outside into itself, and for draining the refrigerant to an outer surface of the shell in the widthwise direction;
   a second outer main flow passage, formed in the vicinity of the other edge in the widthwise direction of the shell inside said outer cover while extending in the lengthwise direction, for receiving the refrigerant having flown in the widthwise direction on the outer surface of the shell after flowing through the first outer main flow passage, and supplying said refrigerant into the shell; and
   a draining pipe for draining the refrigerant having flown on a surface of the coil inside the shell to the outside.

9. The coil unit for a linear motor according to claim 8, further comprising an inner main flow passage, formed on a side of said second outer main flow passage inside said shell while extending in the lengthwise direction, for leading the refrigerant supplied from the second outer main flow passage into itself, and draining the refrigerant out on the surface of the coil inside said shell in the widthwise direction.

10. The coil unit for a linear motor according to claim 8, further comprising a second inner main flow passage, formed on a side of said first outer main flow passage inside said shell while extending in the lengthwise direction, for receiving the refrigerant having flown in the widthwise direction on the surface of the coil inside said shell, and for draining the refrigerant from the draining pipe.

11. The coil unit for a linear motor according to claim 8, further comprising:
   a supplying hole, formed in the vicinity of one end in the lengthwise direction of the outer cover, for supplying the first outer main flow passage with the refrigerant; and
   a communicating hole, formed in the vicinity of the other end in the lengthwise direction of said second outer main flow passage, for supplying the refrigerant guided into itself into the shell,
   wherein said draining pipe for draining the refrigerant is provided at a position corresponding to a vicinity of said supplying hole inside said shell.

12. The coil unit for a linear motor according to claim 11, wherein said draining pipe is provided so as to pass through a vicinity of the downstream side of said supplying hole in the first outer main flow passage.

13. The coil unit for a linear motor according to claim 8, further comprising a plurality of branch flow passages at a predetermined interval in the lengthwise direction on said first outer main flow passage for individually branching the refrigerant led into the first outer main flow passage, and for leading out the refrigerant in the widthwise direction on the outer surface of the shell.

14. The coil unit for a linear motor according to claim 13, further comprising a sub-flow passage in the lengthwise direction, formed at downstream ends of said branch flow passage, for temporarily storing the refrigerant led out from said branch flow passages, and for leading out said refrigerant in the widthwise direction on the outer surface of the shell.

15. A coil unit comprising:
   a shell for a linear motor, the shell storing a coil of the coil unit inside while maintaining a predetermined gap to the coil, and for using a refrigerant to cool the coil;
   an outer cover for storing the shell inside while maintaining a second predetermined gap, and for passing said refrigerant through the second gap for cooling the shell;
   a first guiding path, formed in the vicinity of one edge in a widthwise direction of the coil inside the shell while extending in a lengthwise direction, for leading the refrigerant supplied from the outside into itself, and for leading out said refrigerant in the widthwise direction on a surface of the coil;
   a second guiding path, formed in the vicinity of the other edge in the widthwise direction of the coil while extending in the lengthwise direction, for receiving the refrigerant having flown in the widthwise direction on the surface of the coil after the first guiding path, and for supplying said refrigerant into the second gap between the shell and the outer cover; and
   a draining hole for draining the refrigerant having flown on an outer surface of the shell to the outside.

16. A coil unit, comprising:
   a shell for a linear motor, the shell comprising a coil stored therein, a main flow passage, a plurality of branch passages, and a predetermined gap maintained between the shell and the coil; and
   a refrigerant that cools the coil,
   wherein the main flow passage extends within the shell and in a lengthwise direction of the coil,
   wherein the refrigerant is supplied from outside the shell and through the main flow passage,
   wherein the plurality of branch flow passages extend from the main flow passage in a widthwise direction of the coil and drain the refrigerant from the main flow passage,
   wherein each branch flow passage is separate from a neighboring branch flow passage by a predetermined interval in the lengthwise direction of the coil,
   wherein the refrigerant drained from the plurality of branch flow passages, after flowing through the main flow passage, flows through the predetermined gap maintained between the shell and the coil.

17. The coil unit according to claim 16, wherein the main flow passage is a first main flow passage and the shell further comprises a second main flow passage which extends within the shell and in the lengthwise direction of the coil,
wherein the first main flow passage is provided in a vicinity of a first edge of the shell and the second main passage is formed in a vicinity of a second edge of the shell,
wherein the first edge and second edge are disposed opposite each other relative to a height of the shell, and
wherein the second main flow passage receives the refrigerant having flown on a surface of the coil.

18. The coil unit according to claim 16, further comprising a sub-flow passage formed at downstream ends of the branch flow passages, wherein the sub-flow passage extends in the lengthwise direction of the coil.

19. The coil unit according to claim 18, wherein the sub-flow passage temporarily stores the refrigerant having flown out from the branch flow passages and drains the refrigerant onto a surface of the coil.

20. The coil unit according to claim 16, further comprising a mounting surface formed on an outer peripheral surface of the shell, wherein the main flow passage is disposed between the mounting surface and the coil.

21. The coil unit according to claim 20, wherein the mounting surface connects the coil unit with an associated member and the main flow passage restrains heat from transferring from the coil to the mounting surface.

22. The coil unit according to claim 16, wherein the predetermined interval separating neighboring branch flow passages is narrower at an upstream side relative to a downstream side of the refrigerant flowing through the main flow passage in the lengthwise direction of the coil.

23. The coil unit according to claim 16, wherein at least one of a width of the predetermined gap and a cross-sectional area of each branch flow passage is larger at an upstream side relative to a downstream side of the refrigerant flowing through the main flow passage in the lengthwise direction of the coil.

24. The coil unit according to claim 17, further comprising a draining pipe which extends in the widthwise direction of the coil unit and includes a first end in open communication with an outer peripheral surface at the first edge of the shell and a second end in open communication with the second main flow passage.

25. The coil unit according to claim 24, wherein the refrigerant received by the second main flow passage is drained through the draining pipe, and wherein the refrigerant flowing through the draining pipe restrains heat from transferring from the draining pipe to the shell.

26. A coil unit comprising:
a shell for a linear motor;
a coil disposed in the shell;
a first predetermined gap maintained between the shell and the coil;
an outer cover, wherein the shell is disposed within the outer cover;
a second predetermined gap maintained between the outer cover and the shell;
a first outer main flow passage formed between an interior surface of the outer cover and a first edge of the shell, wherein the first outer main flow passage extends in a lengthwise direction of the coil;
a second outer main flow passage formed between the interior surface of the outer cover and a second edge of the shell,
wherein the second edge of the shell is disposed at an opposite end relative to the first edge, wherein the second outer main flow passage extends in the lengthwise direction of the coil, wherein a refrigerant is supplied to the first outer main passage from outside the outer cover, flows through the first outer main passage, and drains onto an outer surface of the shell in a widthwise direction of the coil, wherein the refrigerant also flows through the second predetermined gap and cools the shell, wherein the second outer main flow passage receives the refrigerant having flown over the shell and through the second predetermined gap and supplies the refrigerant to an interior of the shell, and wherein the refrigerant flows through the first predetermined gap and over a surface of the coil to coot the coil; and
a draining pipe which drains the refrigerant having flown on the surface of the coil to the outside of the outer cover.

27. The coil unit according to claim 26, further comprising an inner main flow passage formed between the second outer main flow passage and the coil, wherein the inner main flow passage extends in the lengthwise direction of the coil.

28. The coil unit according to claim 27, wherein the inner main flow passage receives the refrigerant from the second outer main flow passage and supplies the refrigerant onto a surface of the coil in the widthwise direction of the coil.

29. The coil unit according to claim 26, further comprising a first inner main flow passage formed between the first outer main flow passage and the coil, wherein the first inner main flow passage extends in the lengthwise direction of the coil.

30. The coil unit according to claim 29, wherein the first inner main flow passage receives the refrigerant having flown on the surface of the coil and supplies the refrigerant to the draining pipe.

31. The coil unit according to claim 30, further comprising a second inner main flow passage formed between the second outer main flow passage and the coil, wherein the second inner main flow passage extends in the lengthwise direction of the coil.

32. The coil unit according to claim 31, wherein the second inner main flow passage receives the refrigerant from the second outer main flow passage and supplies the refrigerant onto a surface of the coil in the widthwise direction of the coil.

33. The coil unit according to claim 26, further comprising:
a supply hole defined near one longitudinal end of the outer cover; and
a communication hole defined near another longitudinal end of the outer cover, wherein the draining pipe is provided within the shell at a position corresponding to a location of the supply hole.

34. The coil unit according to claim 33, wherein the supply hole supplies the refrigerant to the first outer main flow passage, and wherein the communication hole supplies the refrigerant into the shell.

35. The coil unit according to claim 33, wherein the draining pipe is disposed to pass through a vicinity of a downstream side of the supply hole in the first outer main flow passage.

36. The coil unit according to claim 26, further comprising a plurality of branch flow passages that extend from the first outer main flow, wherein the plurality of branch flow passages are provided along the lengthwise direction of the coil, and wherein each branch flow passage is separate from a neighboring branch flow passage by a predetermined interval in the lengthwise direction of the coil.

37. The coil unit according to claim 36, wherein each branch flow passage individually branches the refrigerant from the first outer main flow passage in the widthwise direction of the coil and onto the outer surface of the shell.

38. The coil unit according to claim 36, further comprising a sub-flow passage formed at downstream ends of the branch flow passages, wherein the sub-flow passage extends in the lengthwise direction of the coil.

39. The coil unit according to claim 38, wherein the sub-flow passage temporarily stores the refrigerant having flown out from the branch flow passages, and for supplying the refrigerant onto the outer surface of the shell.

40. A coil unit comprising:

a shell for a linear motor;

a coil disposed within the shell;

a first predetermined gap maintained between the shell and the coil, wherein a refrigerant flows through the first predetermined gap to cool the coil;

an outer cover, wherein the shell is disposed within the outer cover;

a second predetermined gap maintained between the outer cover and the shell, wherein the refrigerant flows through the second predetermined gap to cool the shell;

a first guiding path formed in a vicinity of a first widthwise edge inside the shell, wherein the first guiding path extends in a lengthwise direction of the coil;

a second guiding path formed in a second widthwise edge inside the shell, wherein the second guiding path extends in the lengthwise direction of the coil, wherein the first guiding path receives the refrigerant from outside the outer cover and supplies the refrigerant onto a surface of the coil in a widthwise direction, and wherein the second guiding path receives the refrigerant supplied onto the surface of the coil and supplies the refrigerant into the second predetermined gap; and a draining hole that drains the refrigerant having flown on an outer surface of the shell to the outside of the outer cover.

* * * * *